US012696133B2

(12) United States Patent
Kassir et al.

(10) Patent No.:  US 12,696,133 B2
(45) Date of Patent:       Jul. 28, 2026

(54) TECHNIQUES FOR LOW-LATENCY, LOW-LOSS, SCALABLE THROUGHPUT CAPABILITY AT USER EQUIPMENT

(71) Applicant: QUALCOMM Incorporated, San Diego, CA (US)

(72) Inventors: Saadallah Kassir, San Diego, CA (US); Yih-Hao Lin, San Diego, CA (US); Ravi Agarwal, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 18/747,931

(22) Filed: Jun. 19, 2024

(65) Prior Publication Data

US 2025/0392952 A1      Dec. 25, 2025

(51) Int. Cl.
*H04W 28/02*       (2009.01)
*H04L 47/62*       (2022.01)

(52) U.S. Cl.
CPC ..... *H04W 28/0289* (2013.01); *H04L 47/6215* (2013.01); *H04W 28/0278* (2013.01)

(58) Field of Classification Search
CPC ......... H04W 28/0289; H04W 28/0278; H04W 47/6215
See application file for complete search history.

(56) References Cited

U.S. PATENT DOCUMENTS

| | | | |
|---|---|---|---|
| 2008/0144496 A1* | 6/2008 | Bachmutsky | H04L 47/10 370/230.1 |
| 2017/0187641 A1* | 6/2017 | Lundqvist | H04L 47/70 |

| | | | | |
|---|---|---|---|---|
| 2017/0272372 A1* | 9/2017 | Gafni | | H04L 47/32 |
| 2019/0199643 A1* | 6/2019 | Skarve | | H04W 28/0284 |
| 2020/0053018 A1 | 2/2020 | White et al. | | |
| 2021/0112006 A1* | 4/2021 | Francini | | H04L 47/115 |
| 2021/0119941 A1* | 4/2021 | Hoole | | H04W 40/12 |
| 2023/0379398 A1* | 11/2023 | Su | | H04L 47/6215 |
| 2024/0163220 A1* | 5/2024 | Munir | | H04L 47/11 |
| 2025/0088900 A1* | 3/2025 | Henry | | H04L 47/35 |

FOREIGN PATENT DOCUMENTS

WO      WO-2024013545 A1      1/2024

OTHER PUBLICATIONS

International Search Report and Written Opinion—PCT/US2025/032746—ISA/EPO—Sep. 19, 2025.

* cited by examiner

*Primary Examiner* — Jonathan A Bui
(74) *Attorney, Agent, or Firm* — Holland & Hart LLP

(57)      ABSTRACT

Methods, systems, and devices for wireless communications are described. A user equipment (UE) may receive, at a first modem and from a first device, one or more data packets. Based on an explicit congestion notification (ECN) capable transport (ECT) codepoint indication in respective header portions of the data packets, the UE may route the data packets from the first modem to two or more queues associated with a second modem of the UE. Based on receiving buffer and link state information associated with the second modem, the UE may perform a congestion indication procedure that is associated with congestion of a communication link associated with the UE. The UE may thereafter transmit, to a second device, packet data from the two or more queues associated with the second modem of the UE based on a respective priority associated with the two or more queues.

20 Claims, 17 Drawing Sheets

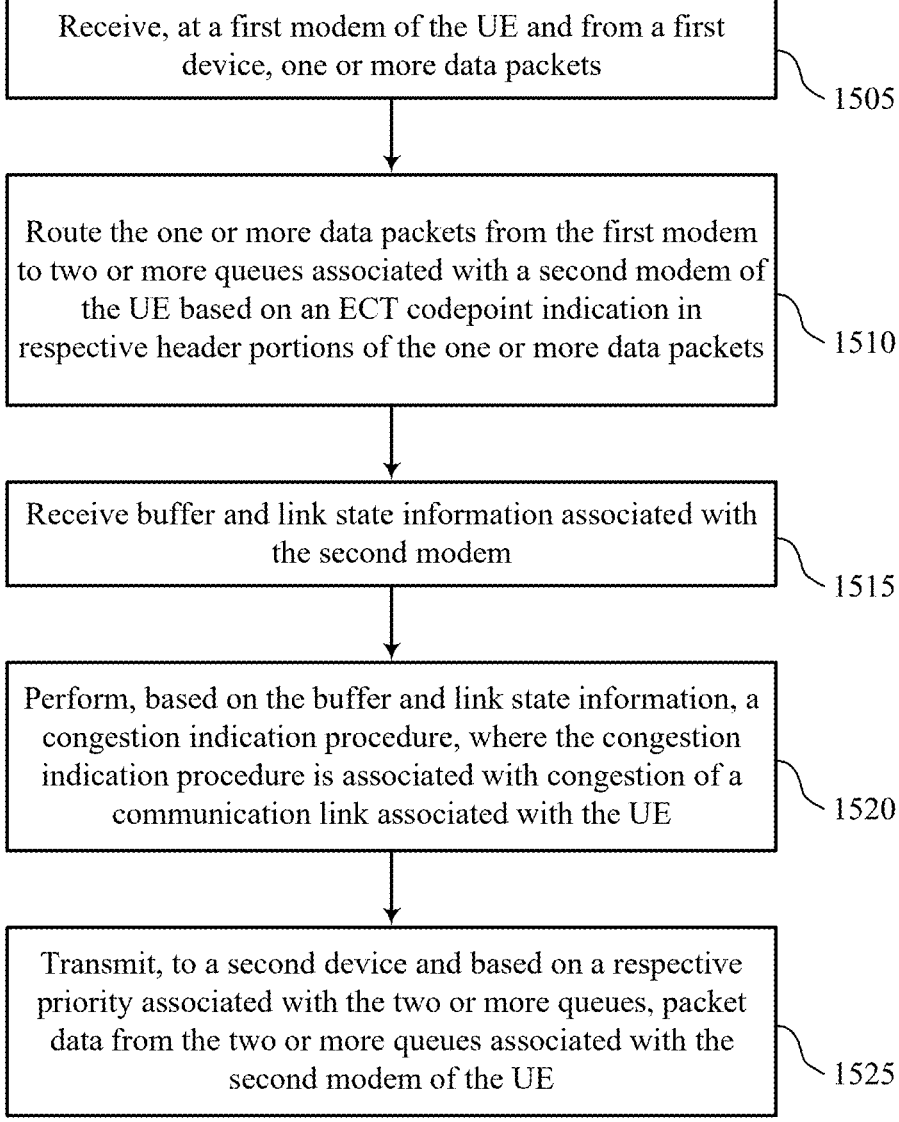

Receive, at a first modem of the UE and from a first device, one or more data packets

1505

Route the one or more data packets from the first modem to two or more queues associated with a second modem of the UE based on an ECT codepoint indication in respective header portions of the one or more data packets

1510

Receive buffer and link state information associated with the second modem

1515

Perform, based on the buffer and link state information, a congestion indication procedure, where the congestion indication procedure is associated with congestion of a communication link associated with the UE

1520

Transmit, to a second device and based on a respective priority associated with the two or more queues, packet data from the two or more queues associated with the second modem of the UE

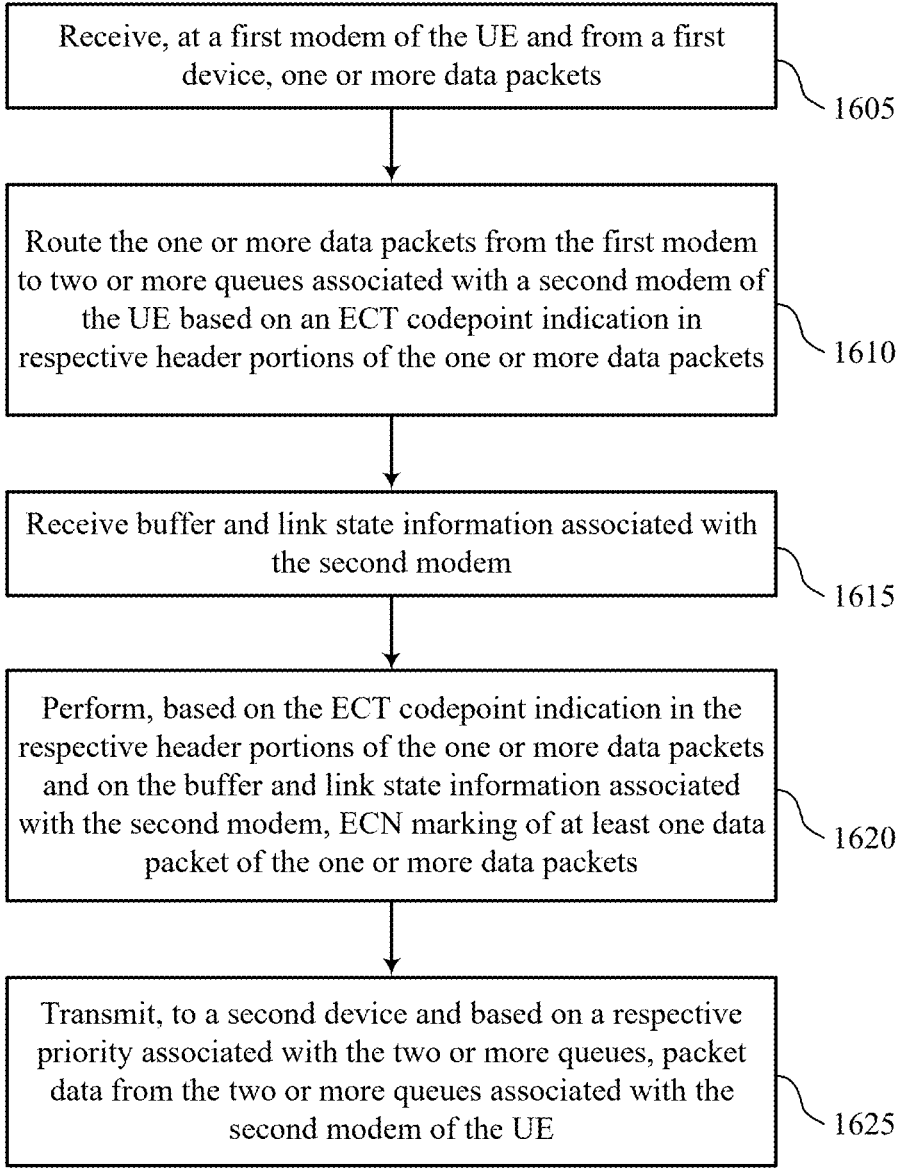

Receive, at a first modem of the UE and from a first device, one or more data packets

1605

Route the one or more data packets from the first modem to two or more queues associated with a second modem of the UE based on an ECT codepoint indication in respective header portions of the one or more data packets

1610

Receive buffer and link state information associated with the second modem

1615

Perform, based on the ECT codepoint indication in the respective header portions of the one or more data packets and on the buffer and link state information associated with the second modem, ECN marking of at least one data packet of the one or more data packets

1620

Transmit, to a second device and based on a respective priority associated with the two or more queues, packet data from the two or more queues associated with the second modem of the UE

TECHNIQUES FOR LOW-LATENCY, LOW-LOSS, SCALABLE THROUGHPUT CAPABILITY AT USER EQUIPMENT

FIELD OF TECHNOLOGY

The following relates to wireless communications, including techniques for Low-Latency, Low-Loss, Scalable Throughput (L4S) capability at a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving, at a first modem of the UE and from a first device, one or more data packets, routing the one or more data packets from the first modem to two or more queues associated with a second modem of the UE based on an explicit congestion notification (ECN)-capable transport (ECT) codepoint indication in respective header portions of the one or more data packets, receiving buffer and link state information associated with the second modem, performing, based on the buffer and link state information, a congestion indication procedure, where the congestion indication procedure is associated with congestion of a communication link associated with the UE, and transmitting, to a second device and based on a respective priority associated with the two or more queues, packet data from the two or more queues associated with the second modem of the UE.

A UE for wireless communications is described. The UE may include one or more memories storing processor executable code, and one or more processors coupled with the one or more memories. The one or more processors may individually or collectively be operable to execute the code to cause the UE to receive, at a first modem of the UE and from a first device, one or more data packets, route the one or more data packets from the first modem to two or more queues associated with a second modem of the UE based on an explicit congestion notification (ECN)-capable transport (ECT) codepoint indication in respective header portions of the one or more data packets, receive buffer and link state information associated with the second modem, perform, based on the buffer and link state information, a congestion indication procedure, where the congestion indication procedure is associated with congestion of a communication link associated with the UE, and transmit, to a second device and based on a respective priority associated with the two or more queues, packet data from the two or more queues associated with the second modem of the UE.

Another UE for wireless communications is described. The UE may include means for receiving, at a first modem of the UE and from a first device, one or more data packets, means for routing the one or more data packets from the first modem to two or more queues associated with a second modem of the UE based on an explicit congestion notification (ECN)-capable transport (ECT) codepoint indication in respective header portions of the one or more data packets, means for receiving buffer and link state information associated with the second modem, means for performing, based on the buffer and link state information, a congestion indication procedure, where the congestion indication procedure is associated with congestion of a communication link associated with the UE, and means for transmitting, to a second device and based on a respective priority associated with the two or more queues, packet data from the two or more queues associated with the second modem of the UE.

A non-transitory computer-readable medium storing code for wireless communications is described. The code may include instructions executable by one or more processors to receive, at a first modem of the UE and from a first device, one or more data packets, route the one or more data packets from the first modem to two or more queues associated with a second modem of the UE based on an explicit congestion notification (ECN)-capable transport (ECT) codepoint indication in respective header portions of the one or more data packets, receive buffer and link state information associated with the second modem, perform, based on the buffer and link state information, a congestion indication procedure, where the congestion indication procedure is associated with congestion of a communication link associated with the UE, and transmit, to a second device and based on a respective priority associated with the two or more queues, packet data from the two or more queues associated with the second modem of the UE.

In some examples of the method, user equipment (UEs), and non-transitory computer-readable medium described herein, routing the one or more data packets to the two or more queues associated with the second modem of the UE may include operations, features, means, or instructions for classifying as Low Latency Low Loss Scalable Throughput (L4S) internet protocol (IP) packets the one or more data packets having the ECT codepoint indication including a first value, where the L4S IP packets may be associated with a first quality of service (QoS) priority level, classifying as classic IP packets the one or more data packets having the ECT codepoint indication including a second value different from the first value, where the classic IP packets may be associated with a second QoS priority level that may be lower than the first QoS priority level, and routing the L4S IP packets to a first queue associated with the second modem and routing the classic IP packets to a second queue associated with the second modem.

In some examples of the method, user equipment (UEs), and non-transitory computer-readable medium described herein, receiving the one or more data packets may include operations, features, means, or instructions for receiving, at a 5G modem of the UE and from a network entity, one or more Low Latency Low Loss Scalable Throughput (L4S) internet protocol (IP) packets, one or more classic IP data packets, or a combination thereof.

In some examples of the method, user equipment (UEs), and non-transitory computer-readable medium described herein, routing the one or more data packets from the first modem to the two or more queues associated with the second modem of the UE may include operations, features, means, or instructions for routing the one or more data packets from a 5G modem of the UE to two or more queues associated with a Wi-Fi modem of the UE.

In some examples of the method, user equipment (UEs), and non-transitory computer-readable medium described herein, receiving the buffer and link state information associated with the second modem may include operations, features, means, or instructions for receiving, from a Wi-Fi modem of the UE, buffer state information associated with buffers associated with the Wi-Fi modem of the UE and link state information associated with a Wi-Fi link between the Wi-Fi modem of the UE and a Wi-Fi modem of a wireless device.

In some examples of the method, user equipment (UEs), and non-transitory computer-readable medium described herein, transmitting the packet data from the two or more queues associated with the second modem of the UE to the second device may include operations, features, means, or instructions for transmitting, via a Wi-Fi link, the packet data from two or more queues associated with a Wi-Fi modem of the UE to a wireless device.

In some examples of the method, user equipment (UEs), and non-transitory computer-readable medium described herein, receiving the one or more data packets may include operations, features, means, or instructions for receiving, at a Wi-Fi modem of the UE and from a wireless device, one or more Low Latency Low Loss Scalable Throughput (L4S) internet protocol (IP) packets, one or more classic IP packets, or a combination thereof.

In some examples of the method, user equipment (UEs), and non-transitory computer-readable medium described herein, routing the one or more data packets from the first modem to the two or more queues associated with the second modem of the UE may include operations, features, means, or instructions for routing the one or more data packets from a Wi-Fi modem of the UE to two or more queues associated with a 5G modem of the UE.

In some examples of the method, user equipment (UEs), and non-transitory computer-readable medium described herein, receiving the buffer and link state information associated with the second modem may include operations, features, means, or instructions for receiving, from a 5G modem of the UE, buffer state information associated with buffers associated with the 5G modem of the UE and link state information associated with a 5G link between the 5G modem of the UE and a network entity.

In some examples of the method, user equipment (UEs), and non-transitory computer-readable medium described herein, transmitting the packet data from the two or more queues associated with the second modem of the UE to the second device may include operations, features, means, or instructions for transmitting, via a 5G link, the packet data from the two or more queues associated with a 5G modem of the UE to a network entity.

In some examples of the method, user equipment (UEs), and non-transitory computer-readable medium described herein, performing the congestion indication procedure may include operations, features, means, or instructions for performing, based on the ECT codepoint indication in the respective header portions of the one or more data packets and on the buffer and link state information associated with the second modem, ECN marking of at least one data packet of the one or more data packets.

In some examples of the method, user equipment (UEs), and non-transitory computer-readable medium described herein, performing the ECN marking of the at least one data packet may include operations, features, means, or instructions for adjusting, from a first value to a second value and based on the buffer and link state information associated with the second modem, the ECT codepoint indication in a respective header portion of the at least one data packet, where the second value indicates that congestion may be detected.

In some examples of the method, user equipment (UEs), and non-transitory computer-readable medium described herein, the at least one data packet includes a Low Latency Low Loss Scalable Throughput (L4S) internet protocol (IP) packet.

In some examples of the method, user equipment (UEs), and non-transitory computer-readable medium described herein, the buffer and link state information includes information associated with buffers associated with a Wi-Fi modem of the UE and information associated with a Wi-Fi link between the Wi-Fi modem of the UE and a Wi-Fi modem of the second device and the second device includes a wireless device.

In some examples of the method, user equipment (UEs), and non-transitory computer-readable medium described herein, the buffer and link state information includes information associated with buffers associated with a 5G modem at the UE and information associated with a 5G link between the 5G modem of the UE and the second device and the second device includes a network entity.

In some examples of the method, user equipment (UEs), and non-transitory computer-readable medium described herein, performing the ECN marking of the one or more data packets may include operations, features, means, or instructions for performing the ECN marking of the one or more data packets based on an ECN marking algorithm, where the ECN marking algorithm includes a buffer state-based marking algorithm, a round-trip time (RTT)-based marking algorithm, a delay-based marking algorithm, or a contention delay-based marking algorithm.

In some examples of the method, user equipment (UEs), and non-transitory computer-readable medium described herein, performing the congestion indication procedure may include operations, features, means, or instructions for transmitting, to the first device and based on the buffer and link state information associated with the second modem, ECN feedback.

In some examples of the method, user equipment (UEs), and non-transitory computer-readable medium described herein, the ECN feedback may be transmitted without performing ECN marking of the one or more data packets.

In some examples of the method, user equipment (UEs), and non-transitory computer-readable medium described herein, the buffer and link state information includes information associated with buffers associated with a Wi-Fi modem of the UE and information associated with a Wi-Fi link between the Wi-Fi modem of the UE and a Wi-Fi modem of the second device and the second device includes a wireless device.

In some examples of the method, user equipment (UEs), and non-transitory computer-readable medium described herein, the buffer and link state information includes information associated with buffers associated with a 5G modem associated with the UE and information associated with a 5G link between the 5G modem of the UE and the second device and the second device includes a network entity.

In some examples of the method, user equipment (UEs), and non-transitory computer-readable medium described herein, the first device includes a network entity and the second device includes a wireless device.

In some examples of the method, user equipment (UEs), and non-transitory computer-readable medium described herein, the first device includes a wireless device and the second device includes a network entity.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

6 munications system that supports techniques for L4S capability at a UE in accordance with one or more aspects of the present disclosure.

Figure 11:
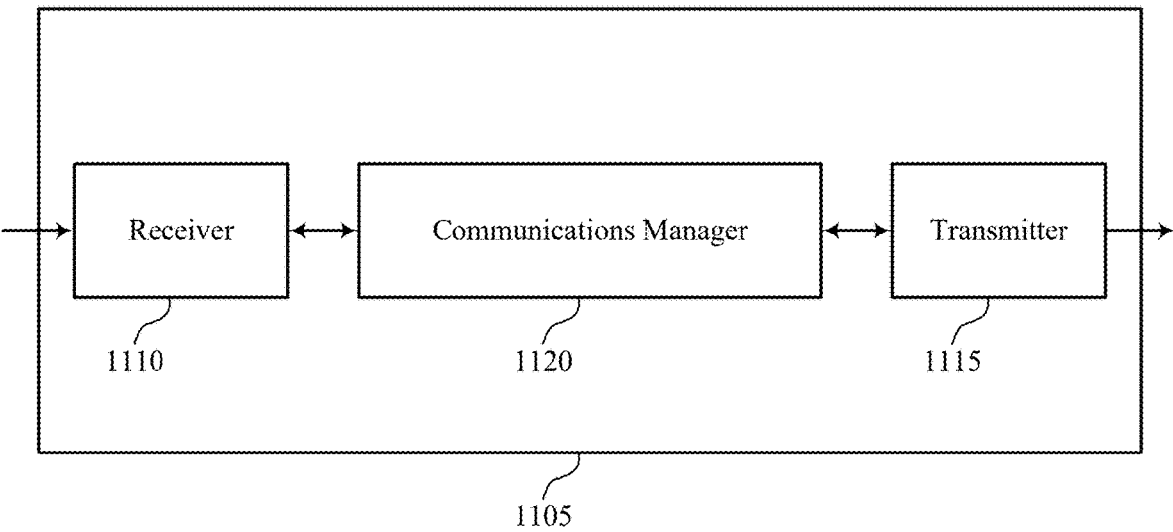
Figure 12:
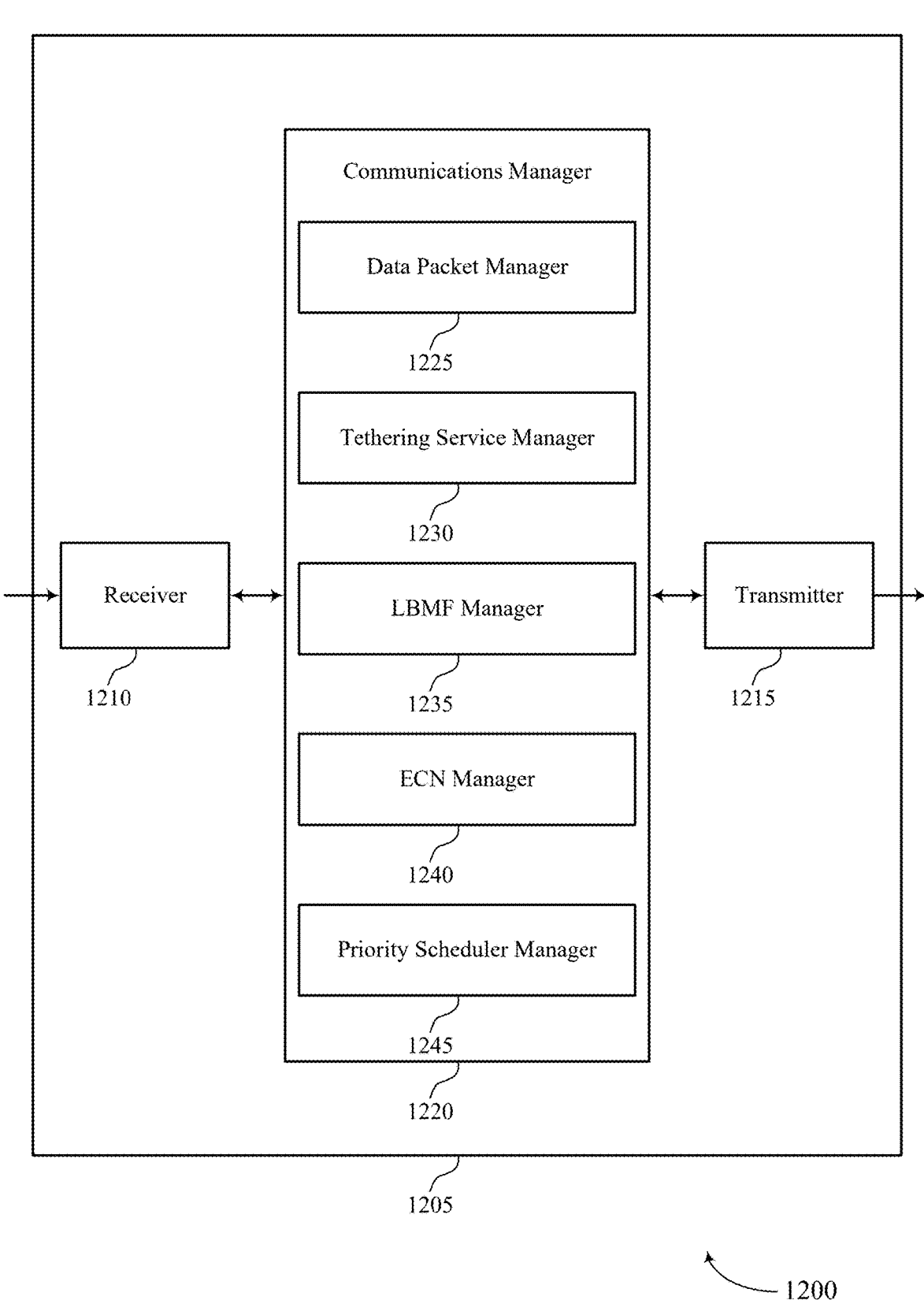

FIGS. 11 and 12 show block diagrams of devices that support techniques for L4S capability at a UE in accordance with one or more aspects of the present disclosure.

Figure 13:
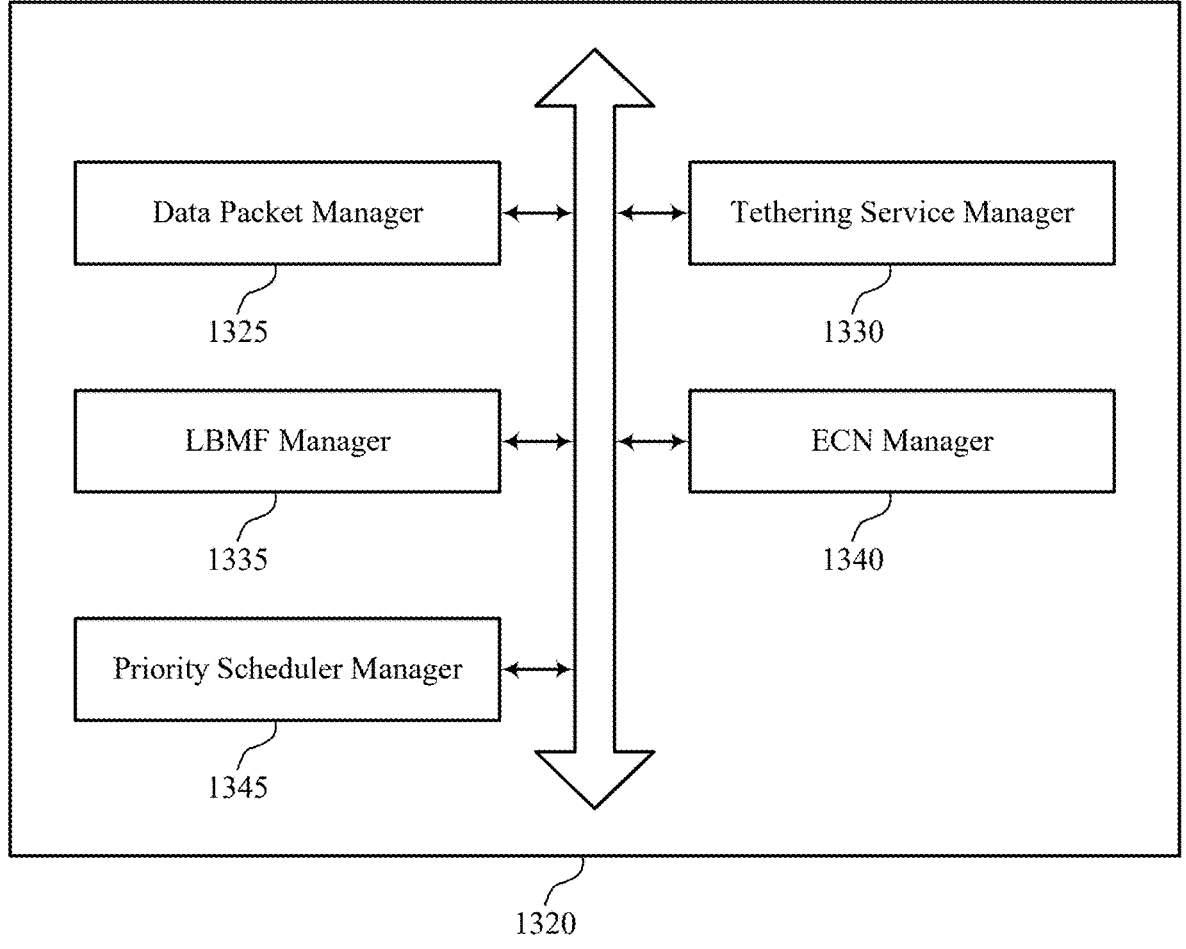

FIG. 13 shows a block diagram of a communications manager that supports techniques for L4S capability at a UE in accordance with one or more aspects of the present disclosure.

Figure 14:
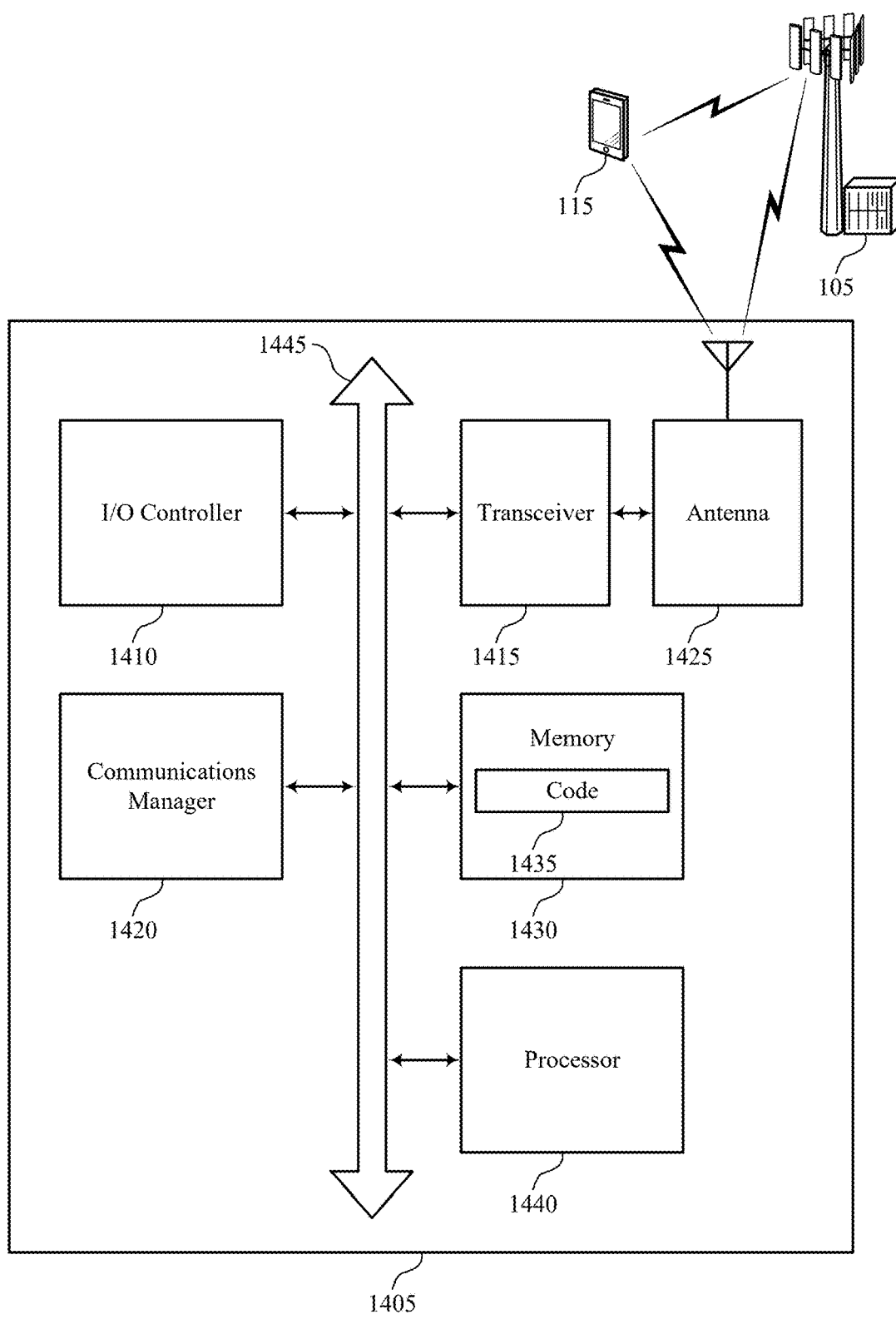

FIG. 14 shows a diagram of a system including a device that supports techniques for L4S capability at a UE in accordance with one or more aspects of the present disclosure.

Figure 17:
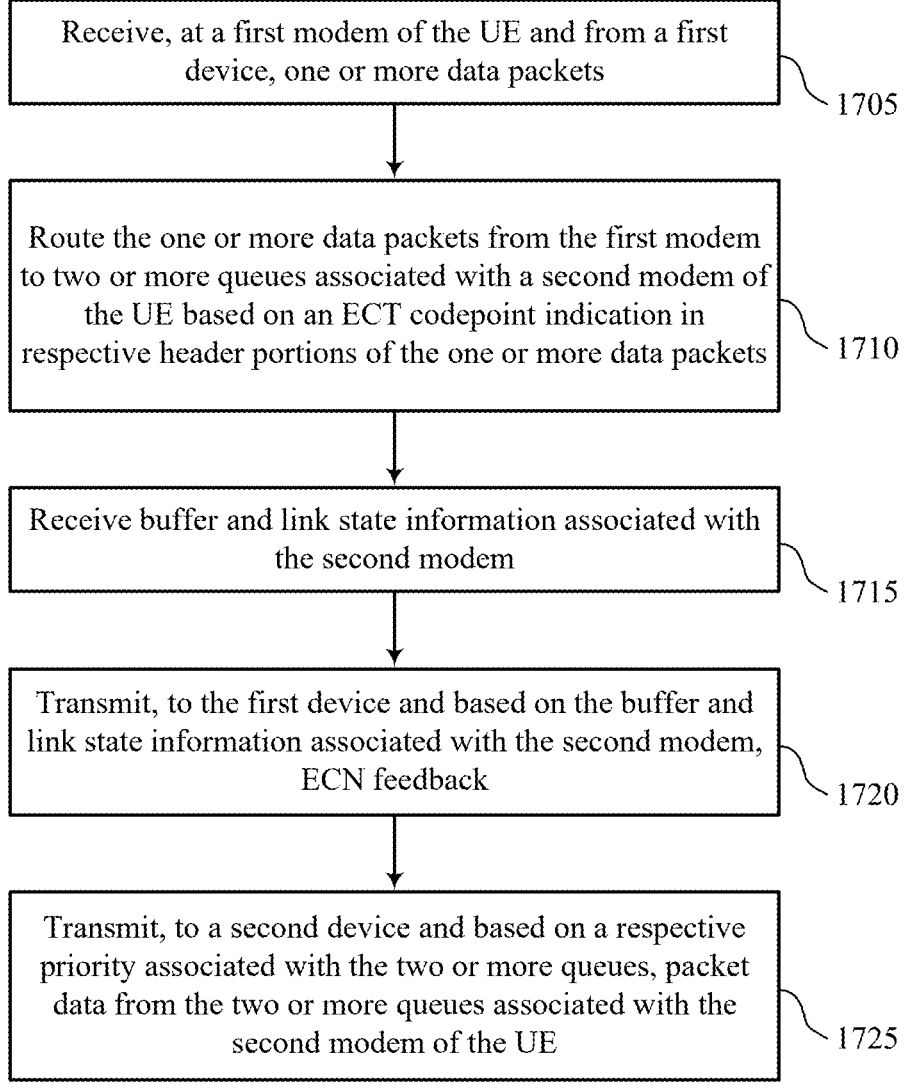

FIGS. 15 through 17 show flowcharts illustrating methods that support techniques for L4S capability at a UE in accordance with one or more aspects of the present disclosure.

DETAILED DESCRIPTION

Extended reality (XR) devices and applications are associated with strict quality of service (QoS) requirements that include low latency, high reliability, high bandwidth, and low device power consumption. To ensure minimal end-to-end (E2E) delay, such as from a server, such as an application server, to an XR device, such as a UE, video rate adaptation mechanisms may be utilized to adjust the video encoding bitrate based on network congestion on a link between the server and the UE. In some cases, the network may assist with congestion control. For instance, a network node that routes the packets between the server and the UE may provide a congestion indication whenever congestion is experienced on the link. The congestion indication may be provided by "marking" the affected packets with a congestion indication. For instance, the network node may utilize an explicit congestion notification (ECN) field in a header of the Internet protocol (IP) packet to provide the congestion indication. The receiving device (such as the UE operating as the XR device) may then use the congestion indication to detect congestion and inform the server of the congestion so that the server may adjust the video encoding bitrate of data transmitted from the server and destined for the XR device. One example of a network-assisted congestion control mechanism that leverages the ECN field in the IP header to provide congestion information to a receiving device may be Low Latency, Low Loss, and Scalable Throughput (L4S).

Conventionally in the L4S framework, the network node that provides the congestion indication resides between the server and a network entity (e.g., gNB) associated with the UE that operates as the XR device. In some cases, the network node is the network entity itself. In such conventional L4S frameworks, the congestion indication is related to congestion on a link between the network entity and the server. In such systems, the network entity (or other network node) conventionally sets the ECN field using an (ECN)-capable transport (ECT) codepoint to provide an indication of whether the packet has experienced congestion. Such network entities may be referred to as ECN/L4S-capable nodes. When the data is received by the receiving device (for example the UE operating as the XR device), the ECN field may be read and the indication of congestion may be reported back to the sending device (e.g., as the server).

In an example XR implementation where a server transmits data to a UE via a network entity, and the UE transmits the data to a separate XR device (e.g., a head-mounted display device (e.g., XR glasses) or other wireless device), the link between the UE and the XR device may be referred to as a phone to glasses (P2G) link. In some cases, the P2G link may be configured over a WLAN communications link, such as a Wi-Fi communications link. In some cases, the P2G Wi-Fi link, as well as a cellular communications link, such as a 5G communications link, between the UE and the network entity, may experience volatility and, as a result, may cause a bottleneck on both uplink and downlink paths between the server and the XR device. In such conventional systems, however, the UE sending data to the XR device and to the network entity may not be ECN/L4S-capable, and thus may not be capable of reporting congestion associated with the P2G or 5G communications links to a receiving device (e.g., to the XR device or the network entity).

In accordance with aspects described herein, the UE may be configured to operate as an ECN/L4S-capable node to indicate congestion over one or more associated communications links.

Aspects of the disclosure are initially described in the context of wireless communications systems. Aspects of the disclosure are further illustrated by and described with reference to apparatus diagrams, system diagrams, and flowcharts that relate to techniques for L4S capability at a UE.

Figure 1:
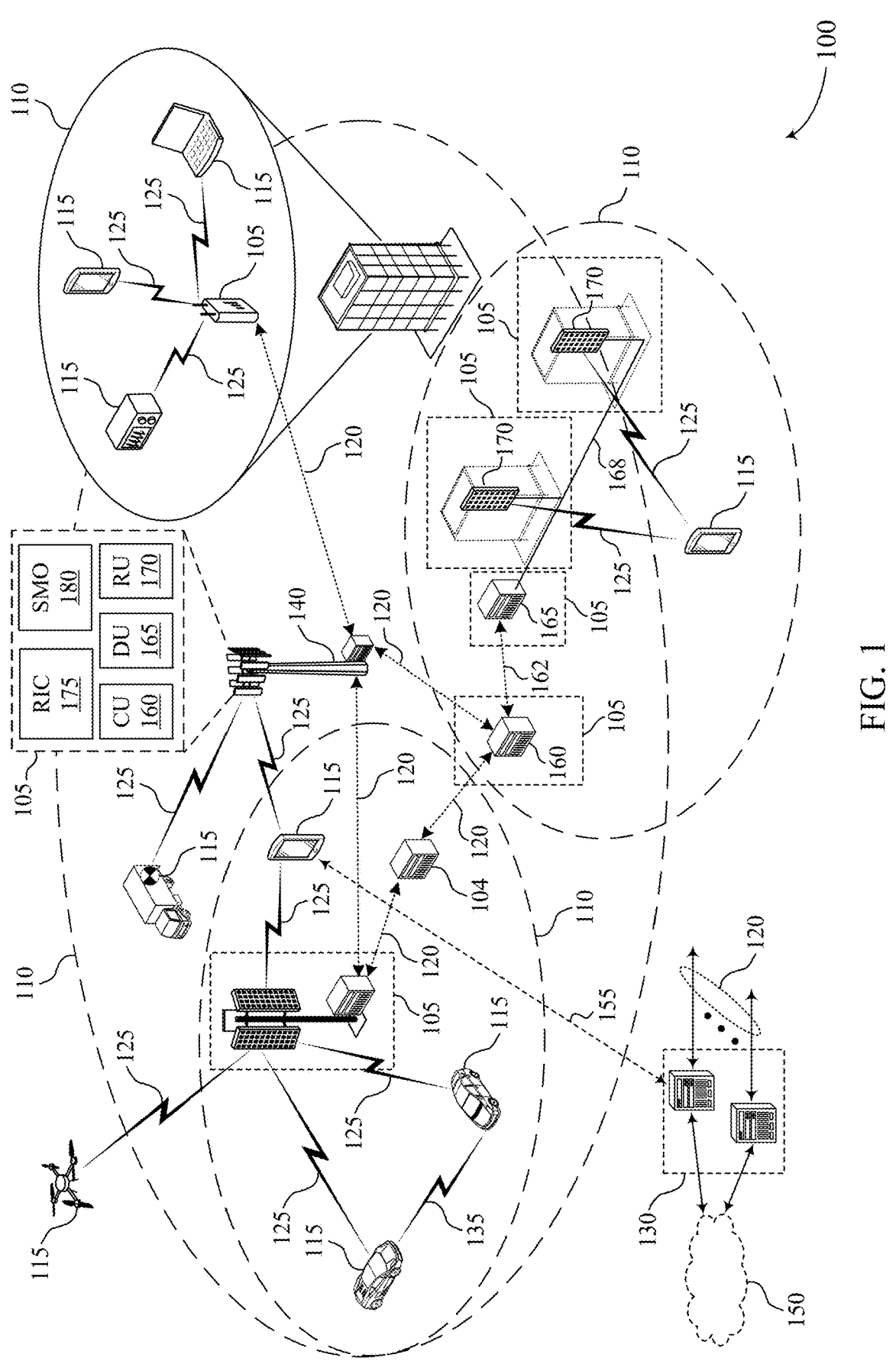
FIG. 1 shows an example of a wireless communications system that supports techniques for Low-Latency, Low-Loss, Scalable Throughput (L4S) capability at a user equipment (UE) in accordance with one or more aspects of the present disclosure.

FIG. 1 shows an example of a wireless communications system 100 that supports techniques for L4S capability at a UE in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N^f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication).

M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, IP connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as those that implement XR-related devices or applications, the UE 115 may utilize a network-assisted congestion control mechanism, such as L4S, to provide congestion information to the one or more other devices, such as to the network entity 105, a server, or a wireless device, such as an XR device. The receiving device may utilize the congestion information to adjust a video encoding bitrate of data to be transmitted to the UE 115.

Figure 2:
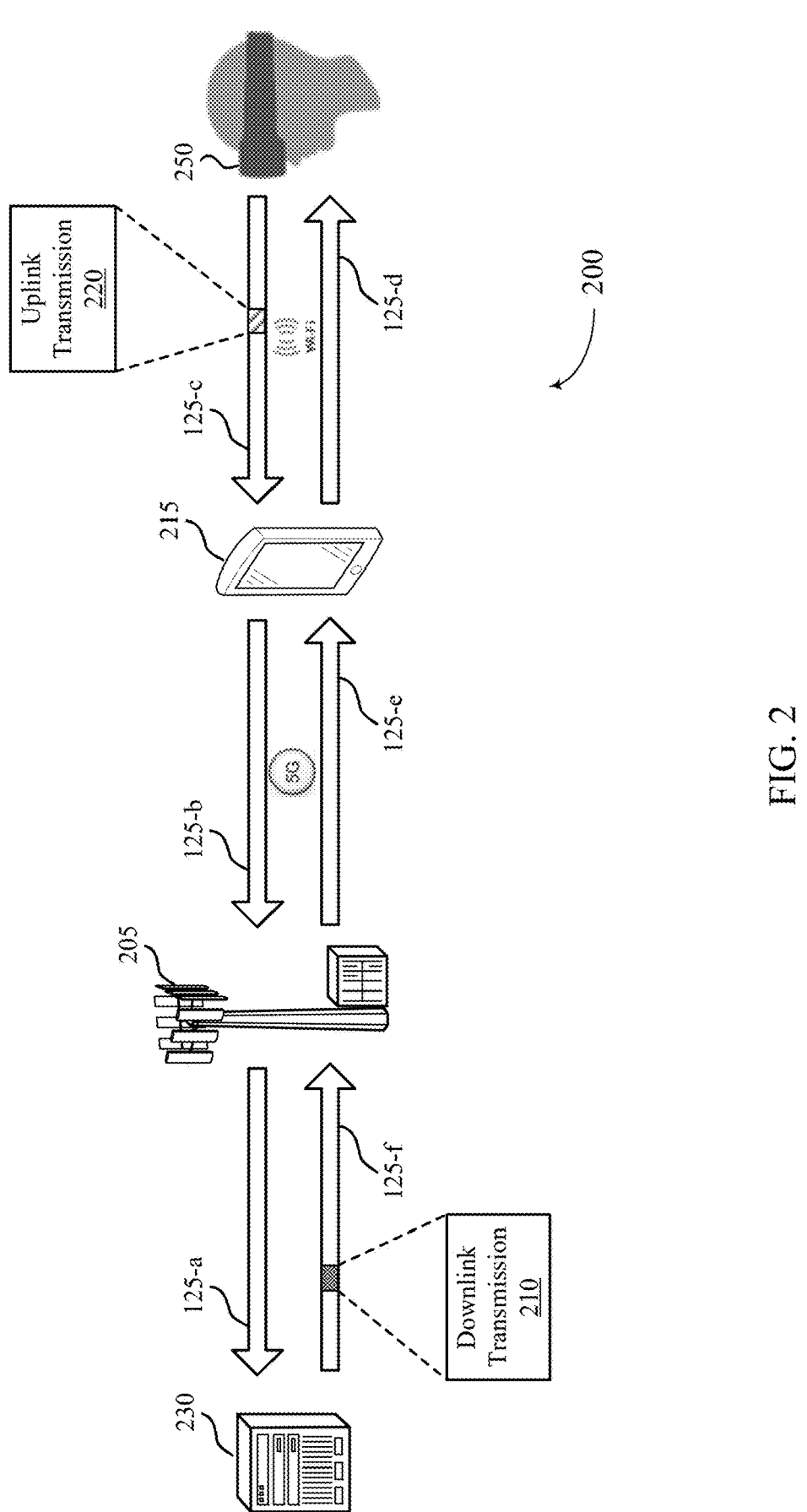
FIG. 2 shows an example of a portion of a wireless communications system that supports techniques for L4S capability at a UE in accordance with one or more aspects of the present disclosure.

FIG. 2 shows an example of a portion of a wireless communications system 200 that supports techniques for L4S capability at a UE in accordance with one or more aspects of the present disclosure. The wireless communications system 200 may be implemented by aspects of the wireless communications system 100 described with reference to FIG. 1. For example, the wireless communications system 200 may include a server 230, a network entity 205, a UE 215, and a wireless device 250. In some cases, the server 230 may be an example of the core network 130 described with reference to FIG. 1 or a server communicatively coupled with the core network 130 or the network entity 205. The network entity 205 and the UE 215 may be examples of the network entity 105 and the UE 115 described with reference to FIG. 1. The server 230, the network entity 205, the UE 215, and the wireless device 250 may communicate using communications links, such as communications links 125-a, 125-b, 125-c, 125-d, 125-e, and 125-f. In some cases, the communications links 125-b and 125-e between the network entity 205 may be a cellular communications link, such as a 5G communications link. In some cases, the communications links 125-c and 125-d between the UE 215 and the wireless device 250 may be a WLAN communications link, such as a Wi-Fi communications link.

In some implementations, the server 230 may be an edge server that serves one or more network entities, such as the network entity 205, or UEs, such as the UE 215, in a geographical area associated with the server 230. In some implementation, the server 230 and the network entity 205 may be implemented as a single entity, for example, the server 230 may be hosted at the network entity 205. In other cases, the network entity 205 may serve as a network switch or node that routes data between the server 230 and the UE 215. In some cases, the server 230 may be or include an application server that supports an application installed, implemented, or used at the UE 215 or the wireless device 250.

In some implementations, the wireless device 250 may be a headset device. For example, the wireless device 250 may be an XR headset device or glasses or other XR device. The wireless device 250 (or in some cases, the UE 215) may use or have installed or implemented thereon an application supported by the server 230. For example, the application may be an application that supports XR functionality, such as a gaming application, an educational application, an e-commerce application, a fitness application, a healthcare application, or any other type of application that may be supported by the wireless device 250.

The server 230 may send or transmit a downlink transmission 210 to the UE 215 via the network entity 205 (e.g., when the server 230 and the network entity 205 are separate entities) or to the wireless device 250 via the network entity 205 (e.g., when the server 230 and the network entity 205 are separate entities) and the UE 215. The downlink transmission 210 may include data to support an application, such as an XR application, at the UE 215 or the wireless device 250. For example, the downlink transmission 210 may include video data, other data (in some cases referred to as classic data), or both.

The wireless device 250 may send or transmit an uplink transmission 220 to the UE 215, to the network entity 205 via the UE 215, or to the server 230 via the UE 215 and the network entity 205 (e.g., when the server 230 and the network entity 205 are separate entities). The uplink transmission 220 may include application-related data to be processed by the UE 215 or the server 230. For example, the uplink transmission 220 may include video data, such as data associated with head poses or hand tracking, classic data, or both.

In accordance with aspects described herein, in the example wireless communications system 200, the UE 215 may be configured to operate as an ECN/L4S-capable node to indicate, to the wireless device 250, network entity 205, or server 230, congestion associated with the cellular communications link (e.g., 5G communications link) or the WLAN communications link (e.g., Wi-Fi link), as well as congestion associated with one or more buffers of the UE 215.

In such cases, the network entity 205, the server 230, or both may negotiate with the UE 215 the use of ECN and L4S. For instance, the negotiation may occur during session initialization. The network entity 205, the server 230, or both may identify whether the downlink path supports L4S (e.g., to set an ECN codepoint appropriately). For instance, the downlink path may not support L4S if one or more intermediate network nodes do not support L4S, if firewalls on the packet route block ECN-marked data packets, or for other reasons. Accordingly, discovery over real-time transport protocol (RTP)/user datagram protocol (UDP)/IP may be performed using the session description protocol (SDP) offer/answer model, e.g., via session initiation protocol (SIP), and using the extended SDP format for ECN support.

Figure 3:
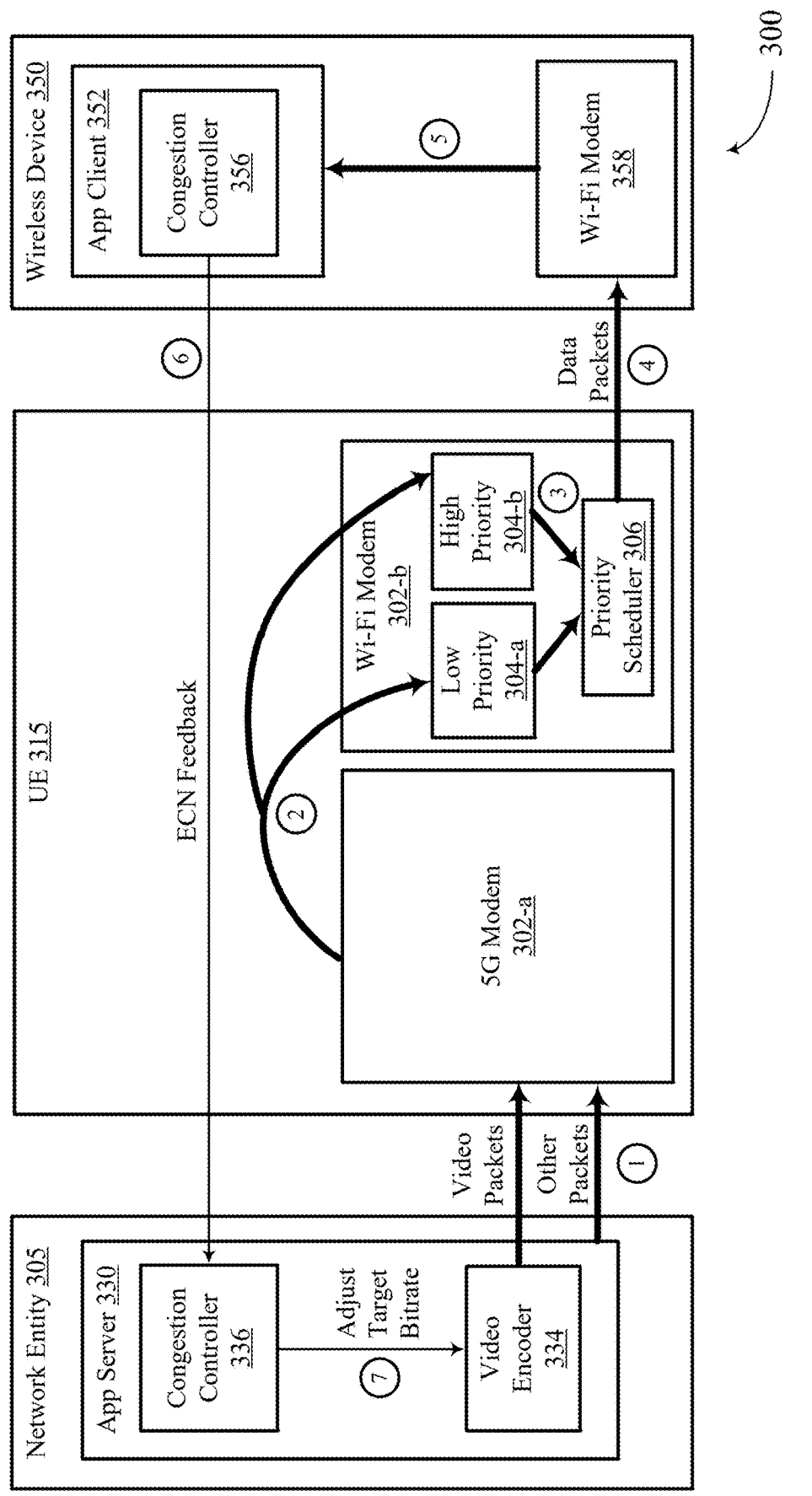
FIG. 3 shows an example of a system architecture illustrating downlink communications between devices of a wireless communications system that supports techniques for L4S capability at a UE in accordance with one or more aspects of the present disclosure.

FIG. 3 shows an example of a system architecture 300 illustrating downlink communications between devices of a wireless communications system that supports techniques for L4S capability at a UE in accordance with one or more aspects of the present disclosure. System architecture 300 may be implemented by aspects of the wireless communications systems 100 and 200, as described with reference to FIGS. 1 and 2. For example, the system architecture 300 may include a network entity 305, a UE 315, and a wireless device 350. The network entity 305 may be an example of the network entity 105 and the network entity 205 described with reference to FIGS. 1 and 2. The UE 315 may be an example of the UE 115 and the UE 215 described with reference to FIGS. 1 and 2. The wireless device 350 may be an example of the wireless device 250 described with reference to FIG. 2.

Some XR applications may be downlink-heavy (e.g., receiving video streams from a server to be processed at an XR device) and rate-adaptation may be helpful for the downlink flow of data. Accordingly, a downlink rate-adaptation procedure may be provided, as described with reference to FIGS. 3 to 6.

In some implementations, the network entity 305 may be configured with a server, such as an application server 330. In some cases, the network entity 305 and the application server 330 may be separate entities that are communicatively coupled with one another. The application server 330 may support or interact with an application client implemented at the UE 315, the wireless device 350, or both. The application server 330 may be configured with a video encoder 334 and a congestion controller 336. The video encoder 334 may encode video packets to be transmitted to the UE 315, the wireless device 350, or both. The congestion controller 336 may receive information indicating congestion associated with one or more communication links or packet buffers associated with the UE 315. In some cases, the congestion controller 336 may control the video encoder 334 to adjust a target bit rate for encoding video packets based on the received congestion information.

In some implementations, the UE 315 may be configured with multiple modems. For instance, the UE 315 may be configured with a cellular modem, such as a 5G modem 302-a, and a WLAN modem, such as a Wi-Fi modem 302-b. The 5G modem 302-a may be used to communicate data between the UE 315 and the network entity 305 via a communications link, such as a cellular communications link (e.g., 5G link). The Wi-Fi modem 302-b may be used to communicate data between the UE 315 and the wireless device 350 via a communications link, such as a WLAN communications link (e.g., a Wi-Fi link). The Wi-Fi modem 302-b may be configured with multiple L4S compliant packet queues, such as a low priority packet queue 304-a and a high priority packet queue 304-b. The Wi-Fi modem 302-b may also be configured with a priority scheduler 306. The priority scheduler 306 may be used to schedule the transmission of data packets from the packet queues 304-a and 304-b to the wireless device 350. The scheduling may be based on a QoS priority associated with the queues.

In some implementations, the wireless device 350 may be configured with a WLAN modem, such as a Wi-Fi modem 358, and with an application client 352. The Wi-Fi modem 358 may be used to communicate data between the wireless device 350 and the UE 315 via a communications link, such as a WLAN communications link (e.g., a Wi-Fi link). The application client 352 may be configured to interact with the application server 330 to support an application at the wireless device 350. The application client 352 may be configured with a congestion controller 356. The congestion controller 356 may receive or obtain information indicating congestion associated with one or more communication links or data buffers associated with the UE 315. In some cases, the congestion controller 336 may report feedback associated with the received congestion information to the application server 330 so that a target bit rate for encoding video packets may be adjusted. In some implementations, the wireless device 350 may be a XR device, such as an XR headset, XR glasses, or other XR device.

In the case of downlink communications at the system architecture 300, the UE 315 may receive, from the network entity 305 and at the 5G modem 302-a, one or more data packets, such as one or more video packets encoded by the video encoder 334, one or more other non-video packets (e.g., classic packets), or both. The UE 315 may classify the one or more data packets as L4S packets or classic packets and may route the data packets from the 5G modem 302-a to appropriate packet queues, such as the low priority packet queue 304-a and the high priority packet queue 304-b, at the Wi-Fi modem 302-b. Based on buffer and link state information obtained from the Wi-Fi modem 302-b, the UE 315 may perform a congestion indication procedure. The congestion indication procedure may cause one or more of the packets in the packet queues to be marked with a congestion indication when congestion is detected based on the buffer and link state information from the Wi-Fi modem 302-b. The marked and unmarked packets may be routed from the low priority packet queue 304-a and the high priority packet queue 304-b to the Wi-Fi modem 358 at the wireless device 350, using the priority scheduler 306 and based on a corresponding QoS priority associated with the packets, the packet queues 304-a and 304-b, or both. The Wi-Fi modem 358 may send the received data packets to the application client 352 for processing. Further, the congestion controller 356 at the application client 352 may read the data packets to identify those marked as indicating that congestion was detected. Based on detecting indications of congestion, the congestion controller 356 may transmit, to the congestion controller 336 at the network entity 305 and via the UE 315, feedback indicating the congestion. In some cases, the congestion controller 336 may control the video encoder 334 to adjust a target encoding bitrate at the video encoder 334.

Figure 4:
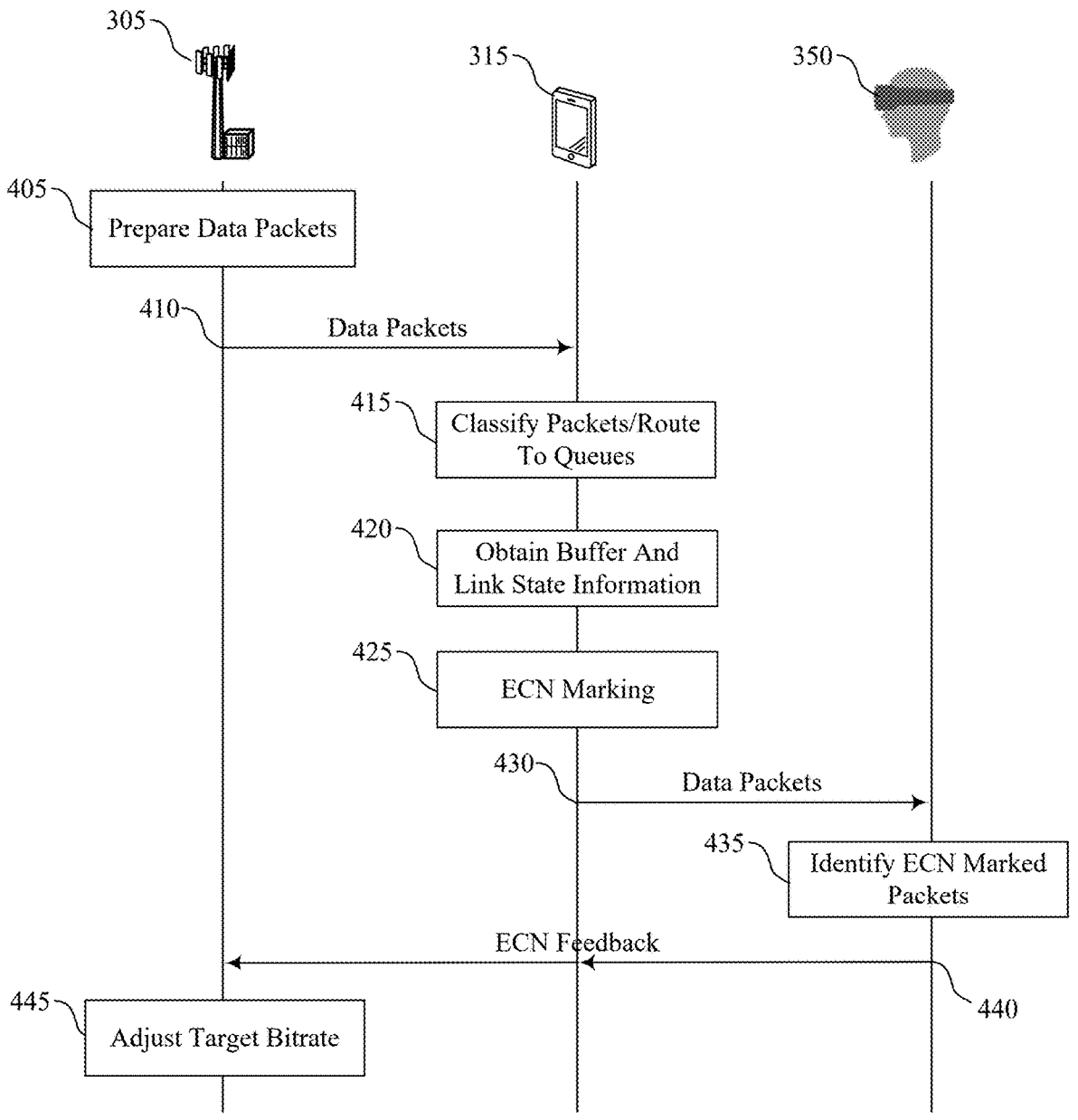
FIG. 4 shows an example of a signal flow illustrating downlink communications between devices of a wireless communications system that supports techniques for L4S capability at a UE in accordance with one or more aspects of the present disclosure.

FIG. 4 shows an example of a signal flow 400 illustrating downlink communications between devices of a wireless communications system that supports techniques for L4S capability at a UE in accordance with one or more aspects of the present disclosure. In some aspects, the signal flow 400 may implement or be implemented by aspects of the wireless communications systems 100 and 200 and system architecture 300 as described with reference to FIGS. 1, 2, and 3, respectively. The signal flow 400 may illustrate the flow of signals between the network entity 305, the UE 315, and the wireless device 350 described with reference to FIG. 3. In the following description of the signal flow 400, the communications between the network entity 305, the UE 315, and the wireless device 350 may be transmitted in a different order than the order shown, or the operations performed by the network entity 305, the UE 315, and the wireless device 350 may be performed in different orders or at different times. Some operations may also be omitted from the signal flow 400, and other operations may be added to the signal flow 400. In some aspects, the operations illustrated in signal flow 400 may be performed by hardware (e.g., including circuitry, processing blocks, logic components, and other components), code (e.g., software or firmware) executed by a processor, or any combination thereof.

At 405, the network entity 305 may prepare data packets for transmission to the UE 315. For instance, one or more video frames may be encoded by the video encoder 334 implemented at the application server 330, to generate video packets (e.g., video IP packets) for downstream transmission, via the UE 315, to the wireless device 350. Encoding bitrate decisions may be based on over-the-top (OTT) measurements, ECN feedback received from the wireless device 350 and associated with a Wi-Fi link or the Wi-Fi modem 302-*b* at the UE 315, or both. In addition to the video IP packets, one or more other non-video packets, e.g., classic packets, may be prepared for transmission to the UE 315. In some cases, before transmission of the data packets to the UE 315, the network entity 305 may set an ECN field in an IP header of one or more of the data packets to indicate whether the data packet is associated with an ECN capable traffic flow, L4S capable traffic flow, or other type of traffic flow. For instance, the IP header of each data packet may include an ECN field (e.g., a two-bit field) that may be marked or set to indicate whether the data packet is a 'Not ECN-capable transport,' an 'ECN-capable transport—ECT (0) codepoint,' or an 'L4S-capable transport—ECT(1) codepoint.' Further, if the network entity 305 experiences local congestion, the network entity 305 may set the ECN field to indicate 'Congestion experienced—CE.'

At 410, the network entity 305 may transmit, and the UE 315 may receive, the data packets. For instance, after setting the ECN field in a packet header of one or more of the data packets, the network entity 305 may transmit the data packets to the UE 315. In some cases, the network entity 305 may establish and transmit the data packets over a 5QI bearer. The data packets may be received at a cellular modem of the UE 315, such as the 5G modem 302-*a*. In some cases, the UE 315 may additionally receive data packets from one or more other network entities or servers.

At 415, the UE 315 may classify the received data packets and route the data packets to one or more L4S compliant packet queues. For instance, to operate as an L4S-capable node, the UE 315 may implement an Active Queue Management (AQM) mechanism and may classify and segregate L4S data packets from other (e.g., classic) data packets. In some cases, the UE 315 may implement or be configured with a tethering service at an operating system of the UE 315. The tethering service may receive the data packets from the 5G modem 302-*a* and may classify the data packets as L4S data packets or classic data packets. The tethering service may inspect the ECN field in the packet header to determine whether the packet is an L4S data packet or a classic data packet. For instance, if the ECN field is set to ECT(1) codepoint, the data packet may be determined to be an L4S data packet (e.g., a high priority flow), and other data packets may be determined to be classic data packets (e.g., lower priority flows). In some cases, out of an abundance of caution, data packets marked as CE may also be classified as L4S data packets, since the UE 315 may not otherwise be able to determine whether the data packet was associated with an L4S flow or not.

The tethering service may thereafter segregate data packets classified as L4S data packets (e.g., the ECT(1) codepoint and CE marked data packets) from data packets classified as classic data packets. The UE 315 may implement DualQ Coupled AQM to segregate and manage the L4S and classic data flows. Accordingly, the tethering service may route the L4S and classic data packets to separate corresponding packet queues associated with or implemented at the Wi-Fi modem 302-*b* (in some cases, the packet queues may be implemented external from the Wi-Fi modem 302-*b*, such as when the Wi-Fi modem 302-*b* does not support priority scheduling). For instance, the classic packets may be routed to a first queue that handles classic data traffic, such as to a low priority packet queue 304-*a* associated with or implemented at the Wi-Fi modem 302-*b*. While the L4S packets may be routed to a second queue that handles L4S data traffic, such as to a high priority packet queue 304-*b* associated with or implemented at the Wi-Fi modem 302-*b*. In this way, the Wi-Fi modem 302-*b* may be able to treat the different types of traffic differently, such as by ensuring that high-priority traffic, such as the L4S data traffic, receives preferential treatment over lower priority traffic, such as the classic data traffic.

At 420, the UE 315 may obtain buffer and link state information. For instance, UE 315 may implement or be configured with a link and buffering monitoring function (LMBF), which may obtain buffer state information associated with the packet queues 304-*a* and 304-*b* at the Wi-Fi modem 302-*b* (e.g., buffer states), link state information associated with a Wi-Fi link between the Wi-Fi modem 302-*b* of the UE 315 and the Wi-Fi modem 358 of the wireless device 350 (e.g., Wi-Fi Link Capacity Estimate (LCE), or both. In some cases, the UE 315 may implement a cross-layer API that may be utilized to by the LBMF to obtain the buffer and link stat information from the Wi-Fi modem 302-*b*.

At 425, the UE 315 may perform a congestion indication procedure. For instance, the UE 315 may perform ECN marking of one or more of the data packets. The LBMF may utilize the obtained buffer and link state information to determine whether congestion is detected at the Wi-Fi modem 302-*b* or the Wi-Fi link, and may utilize a marking algorithm to perform ECN marking of one or more of the data packets based at least in part on the buffer and link state information. For instance, the LBMF may utilize a marking algorithm to mark one or more data packets in the packet queues 304-*a* and 304-*b* when congestion is detected at the Wi-Fi modem 302-*b* or the Wi-Fi link. Example marking algorithms that may be utilized by the LBMF include an L4S buffer state-based marking algorithm, a round-trip time (RTT)-based marking algorithm, a delay-based marking algorithm, and a contention-based marking algorithm.

The L4S buffer state-based marking algorithm (e.g., a random early detection (RED) algorithm extended for ECN) may be similar to ECN marking at a network node. In this case, the LBMF may mark a data packet arriving in the packet queue 304-*a* or 304-*b* (pre-ciphering) with CE with probability $p_{mark}$. With this algorithm, either head or tail marking may be implemented (e.g., marking packets that leave or enter the packet queue, respectively).

The RTT-based marking algorithm (e.g., a modified RED extended for ECN) may utilize Wi-Fi frame RTT data. For instance, the Wi-Fi modem 302-*b* may provide Wi-Fi frame RTT data to the LBMF. The Wi-Fi frame RTT may be computed using in-band data and ACK signals received by the Wi-Fi modem 302-*b*. The LBMF may use the Wi-Fi frame RTT information to compute $p_{mark}$. With this algorithm, both head and tail marking may be implemented.

The delay-based marking algorithm (e.g., a modified RED extended for ECN algorithm) may compute an estimated delay. For instance, the LBMF may estimate a delay and compute $p_{mark}$ accordingly. The estimated delay may be computed differently depending on whether head or tail marking is used. For instance, if head marking is used, then estimated delay=SMOOTH($q_i$), where $q_i$ is the queueing delay (e.g., in seconds) experienced by data packet i. If tail marking is used, then estimated delay=SMOOTH($q_H$), where $q_H$ is the queueing delay (e.g., in seconds) experienced by the data packet at the head of the queue. The Wi-Fi modem 302-b may provide a P2G LCE to the LBMF, and the LBMF may use this information to estimate queueing plus an on-time arrival (OTA) delay and to compute $p_{mark}$. The estimated delay may be computed as $$SMOOTH\left(\frac{\sum_j d_j}{C}\right),$$

where the sum is taken over all data packets in the packet queues 304-a and 304-b.

The contention-based marking algorithm (e.g., a modified RED extended for ECN algorithm) may utilize a carrier sense multiple access (CSMA) backoff timer (e.g., contention delay). For instance, the Wi-Fi modem 302-b may provide CSMA backoff timer information to the LBMF, and the LBMF may use such information to compute $p_{mark}$. With this algorithm, both head and tail marking may be implemented. This algorithm may be relevant to Wi-Fi interference-limited scenarios when multiple UE/wireless device pairs may be operating over the same Wi-Fi link.

In some cases, different marking algorithms may be used. The LBMF may utilize one or more of the marking algorithms to determine whether one or more data packets should be marked to indicate congestion. If one or more of the data packets are to be marked, the LBMF mark the data packet by switching the ECT codepoint in the ECN field of the packet header to CE to provide an indication that the data packet experienced congestion.

At 430, the UE 315 may transmit, and the wireless device 350 may receive, the data packets. For instance, the UE 315 may utilize the priority scheduler 306 implemented or configured at the Wi-Fi modem 302-b to schedule transmission of the data packets from the packet queues 304-a and 304-b, based on respective priorities associated with the packet queues 304-a and 304-b. For instance, the priority scheduler 306 may prioritize transmission of the data packets in the high priority packet queue 304-b over data packets in the low priority packet queue 304-a. In some implementations, the Wi-Fi modem 302-b may implement its own QoS and prioritization mechanisms based on vendor specific APIs. This may allow a target QoS level per packet to be indicated to the Wi-Fi modem 302-b. In other implementations, such as when the Wi-Fi modem 302-b does not implement its own QoS and prioritization mechanisms, the DiffServ field (e.g., DSCP marking) in the IP header of a data packet may be used by the LBMF to indicate that the data packet has a higher priority for L4S flow. For instance, DSCP marking may be used to map traffic flows to Wi-Fi Access Category (AC) and User Priority (UP), thereby routing the flows into different packet queues. In other implementations, such as when the Wi-Fi modem 302-b might not have any mechanisms to segregate the L4S and classic data packets into separate packet queues, the UE 315 may implement new packet queues upstream of the Wi-Fi modem 302-b to ensure the packet segregation in order to remain L4S compliant. In such cases, the Wi-Fi modem 302-b may indicate to the priority scheduler 306 once its buffer becomes empty and this may prompt the priority scheduler 306 to dequeue whenever the Wi-Fi modem 302-b indicates that it is available to receive additional data packets.

At 435, the wireless device 350 may identify the ECN marked packets. For instance, the wireless device 350 may implement a congestion controller 356 at an application layer, such as at the application client 352. The congestion controller 356 may inspect the packet headers of each of the data packets and read the ECN field to determine whether congestion was experienced by the data packet. If the ECN field indicates CE, the congestion controller 356 may determine that congestion was experienced by the data packet. The congestion controller 356 may count a quantity of packets that have been marked with CE to determine an amount or percentage of data packets that experienced congestion at the Wi-Fi modem 302-b or the Wi-Fi link.

At 440, the wireless device 350 may transmit ECN feedback to the network entity 305. For instance, the congestion controller 356 may transmit ECN feedback to the congestion controller 336 implemented at the application server 330. In some cases, the ECN feedback may be transmitted to the network entity 305, via the UE 315. The ECN feedback may be based on the determined amount or percentage of data packets that experienced congestion at the Wi-Fi modem 302-b or the Wi-Fi link. The ECN feedback may be transmitted in a feedback report via real-time control protocol (RTCP) feedback. The feedback may be immediate after each data packet is received or may be pooled into a single feedback after multiple data packets are received.

At 445, the network entity 305 may adjust a target bitrate for encoding data packets. For instance, the congestion controller 336 may utilize an L4S-compliant congestion control algorithm to calculate a target bitrate based on the feedback from the wireless device 350. The congestion controller 336 may control the video encoder to adjust a video encoding bitrate based on the calculated target bitrate.

Figure 5:
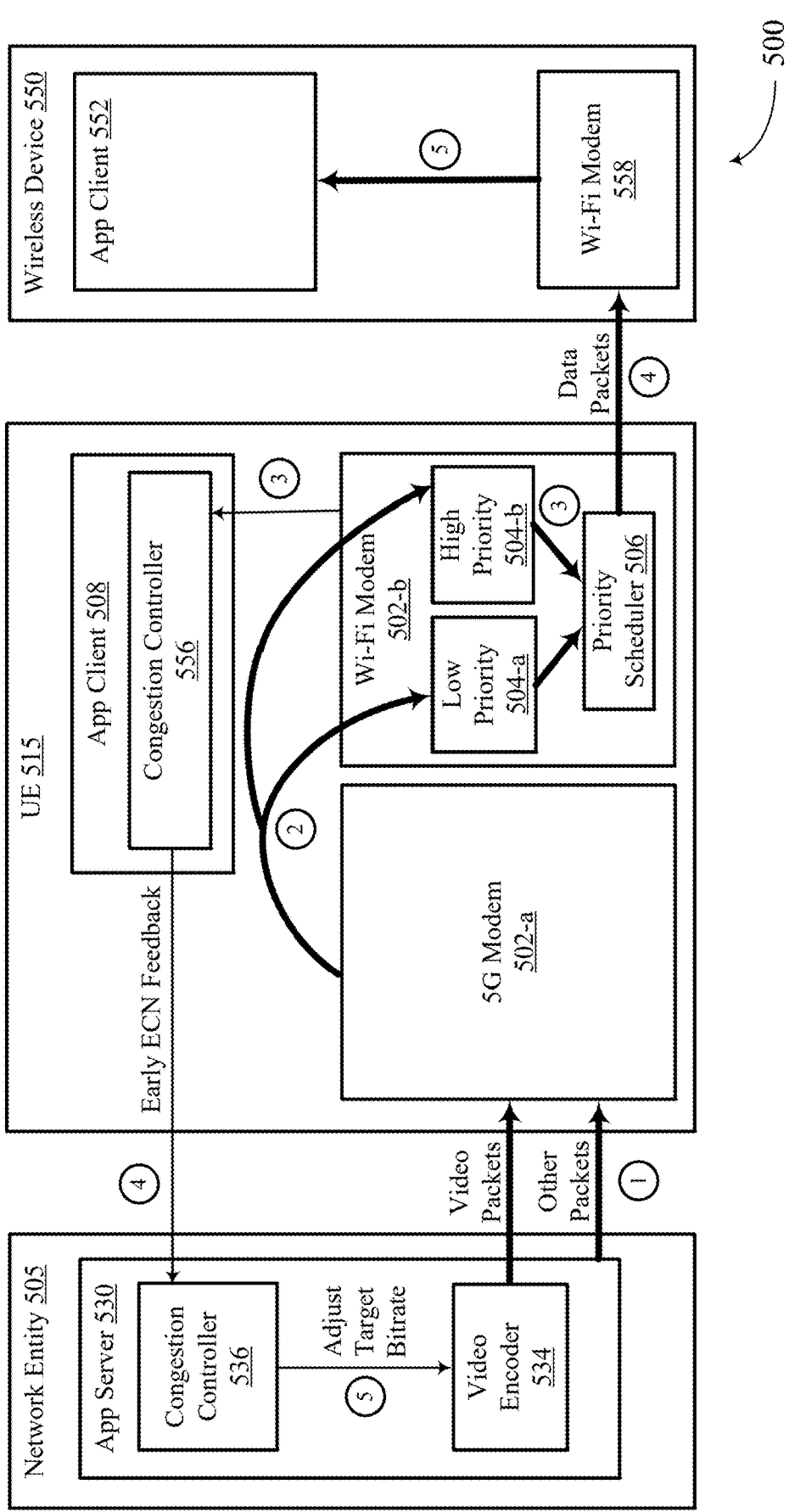
FIG. 5 shows an example of a system architecture illustrating downlink communications between devices of a wireless communications system that supports techniques for L4S capability at a UE in accordance with one or more aspects of the present disclosure.

FIG. 5 shows an example of a system architecture 500 illustrating downlink communications between devices of a wireless communications system that supports techniques for L4S capability at a UE in accordance with one or more aspects of the present disclosure. System architecture 500 may be implemented by aspects of the wireless communications systems 100 and 200 and system architecture 300, as described with reference to FIGS. 1, 2, and 3, respectively. For example, the system architecture 500 may include a network entity 505, a UE 515, and a wireless device 550. The network entity 505 may be an example of the network entities 105, 205, and 305 described with reference to FIGS. 1, 2, 3, and 4. The UE 515 may be an example of the UEs 115, 215, and 315 described with reference to FIGS. 1, 2, 3, and 4. The wireless device 550 may be an example of the wireless devices 250 and 350 described with reference to FIGS. 2, 3, and 4.

The system architecture 500 may be similar to system architecture 300, except that rather than implementing the application client and corresponding congestion controller at the wireless device, such as the wireless device 550, the application client and congestion controller may be implemented at the UE, such as the UE 515. In such cases, the LBMF may not mark the data packets received from the network entity 505 with the congestion indication and, instead, may directly send ECN feedback (e.g., early ECN feedback) to the network entity 505 based on the buffer and link state information associated with the Wi-Fi modem 502-b. In this way, the congestion indication does not need to make a trip from the UE 515 to the wireless device 550 and then to the network entity 505. Instead, an early indication of congestion on the Wi-Fi link or at the Wi-Fi modem 502-*b* may be provided directly to the network entity 505, while bypassing the wireless device 350, so that the network entity 505 may make adjustments to the encoding bitrate sooner.

Accordingly, in the case of downlink communications at the system architecture 500, the UE 515 may receive, from the network entity 505 and at a 5G modem 502-*a*, one or more data packets, such as one or more video packets encoded by the video encoder 534, one or more other non-video packets (e.g., classic packets), or both. The UE 515 may classify the one or more data packets as L4S packets or classic packets and may route the data packets from the 5G modem 502-*a* to appropriate packet queues, such as the low priority packet queue 504-*a* and the high priority packet queue 504-*b*, at the Wi-Fi modem 502-*b*. Based on buffer and link state information obtained from the Wi-Fi modem 502-*b*, the UE 515 may perform a congestion indication procedure. The congestion indication procedure may involve the transmission of congestion-related feedback from the UE 515 to the network entity 505 based on the buffer and link state information from the Wi-Fi modem 502-*b*. In some cases, based on the received buffer and link state information, the congestion controller 536 at the network entity 505 may control the video encoder 534 to adjust a target encoding bitrate at the video encoder 534. Further, before, after, or concurrent with transmission of the congestion feedback to the network entity 505, the UE 515 may route the data packets from the low priority packet queue 504-*a* and the high priority packet queue 504-*b* to the Wi-Fi modem 558 at the wireless device 550, using the priority scheduler 506 and based on a corresponding QoS priority associated with the packets, the packet queues 504-*a* and 504-*b*, or both. The Wi-Fi modem 558 may send the received data packets to the application client 552 for processing.

Figure 6:
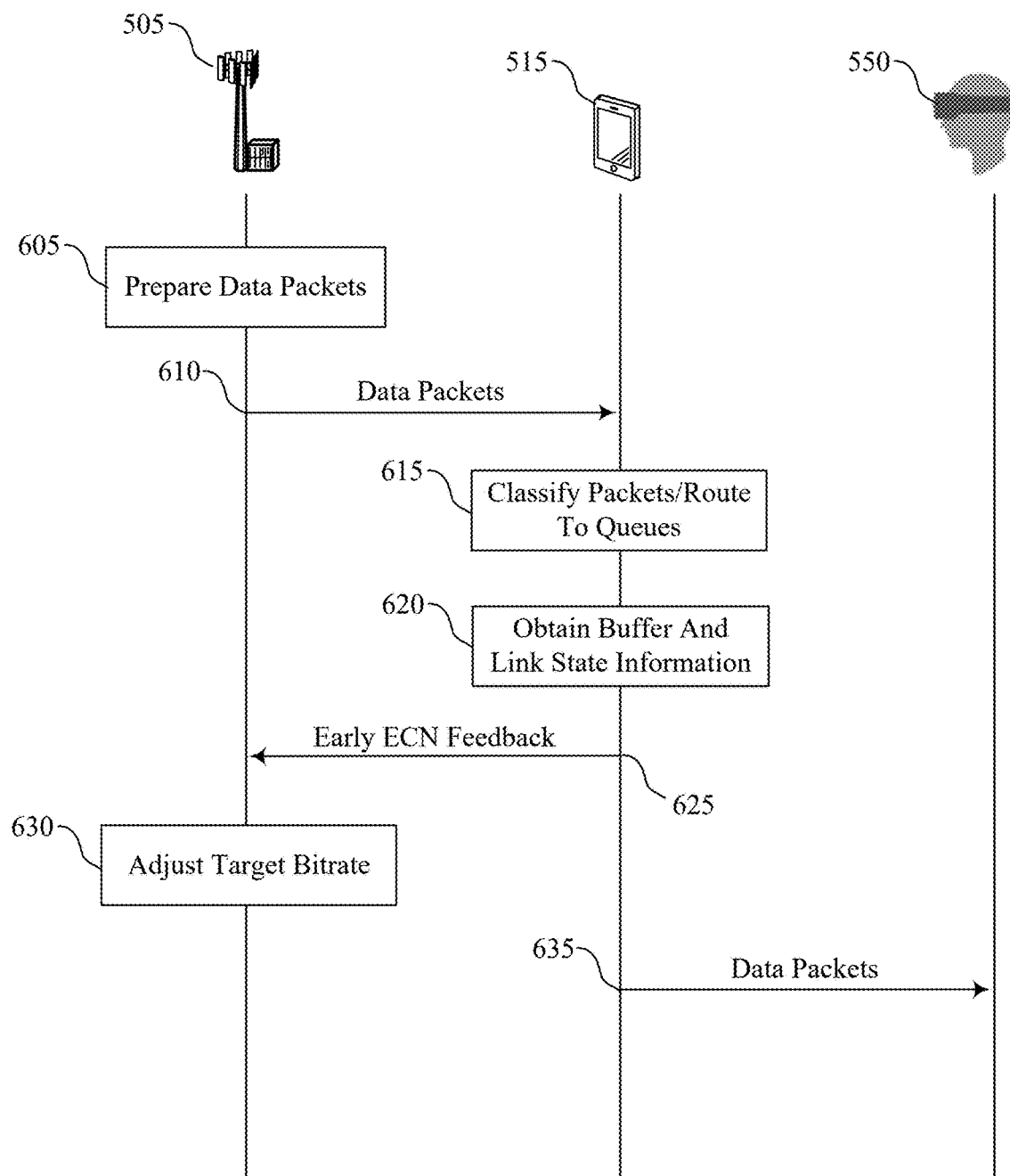
FIG. 6 shows an example of a signal flow illustrating downlink communications between devices of a wireless communications system that supports techniques for L4S capability at a UE in accordance with one or more aspects of the present disclosure.

FIG. 6 shows an example of a signal flow 600 illustrating downlink communications between devices of a wireless communications system that supports techniques for L4S capability at a UE in accordance with one or more aspects of the present disclosure. In some aspects, the signal flow 600 may implement or be implemented by aspects of the wireless communications systems 100 and 200 and system architectures 300 and 500 as described with reference to FIGS. 1, 2, 3, and 5, respectively. The signal flow 600 may illustrate the flow of signals between the network entity 505, the UE 515, and the wireless device 550 described with reference to FIG. 5. In the following description of the signal flow 600, the communications between the network entity 505, the UE 515, and the wireless device 550 may be transmitted in a different order than the order shown, or the operations performed by the network entity 505, the UE 515, and the wireless device 550 may be performed in different orders or at different times. Some operations may also be omitted from the signal flow 600, and other operations may be added to the signal flow 600. In some aspects, the operations illustrated in signal flow 600 may be performed by hardware (e.g., including circuitry, processing blocks, logic components, and other components), code (e.g., software or firmware) executed by a processor, or any combination thereof.

At 605, the network entity 505 may prepare data packets for transmission to the UE 515. For instance, the network entity 505 may prepare the data packets for transmission in a manner similar to that described with reference to 405 of FIG. 4.

At 610, the network entity 505 may transmit, and the UE 515 may receive, the data packets. For instance, the network entity 505 may transmit the data packets to the UE 515 in a manner similar to that described with reference to 410 of FIG. 4.

At 615, the UE 515 may classify the received data packets and route the data packets to one or more L4S compliant packet queues. For instance, the UE 515 may classify and route the data packets in a manner similar to that described with reference to 415 of FIG. 4.

At 620, the UE 515 may obtain buffer and link state information. For instance, the UE 515 may obtain the buffer and link state information in a manner similar to that described with reference to 420 of FIG. 4.

At 625, the UE 515 may perform a congestion indication procedure. For instance, the UE 515 may transmit early ECN feedback to the network entity 505. The congestion controller 556 at the application layer (e.g., at the application client 508) of the UE 515 may transmit the early ECN feedback to the congestion controller 336 at the application server 530 of the network entity 505. The early ECN feedback may be based on a determined amount or percentage of data packets that experienced congestion at the Wi-Fi modem 502-*b* or the Wi-Fi link, such as based on the obtained buffer and link state information. The early ECN feedback may be transmitted in a feedback report via real-time control protocol (RTCP) feedback. The feedback may be immediate after each data packet is received or may be pooled into a single feedback after multiple data packets are received.

At 630, the network entity 505 may adjust a target bitrate for encoding data packets. For instance, the network entity 505 may adjust the target bitrate for encoding data packets based at least in part on the received early ECN feedback, such as in a manner similar to that described with reference to 445 of FIG. 4.

At 635, before, after, or concurrent with transmitting the early ECN feedback to the network entity 505, the UE 515 may transmit, and the wireless device 550 may receive, the data packets. For instance, the UE 515 may transmit the data packets to the wireless device 550 in a manner similar to that described with reference to 430 of FIG. 4.

Figure 7:
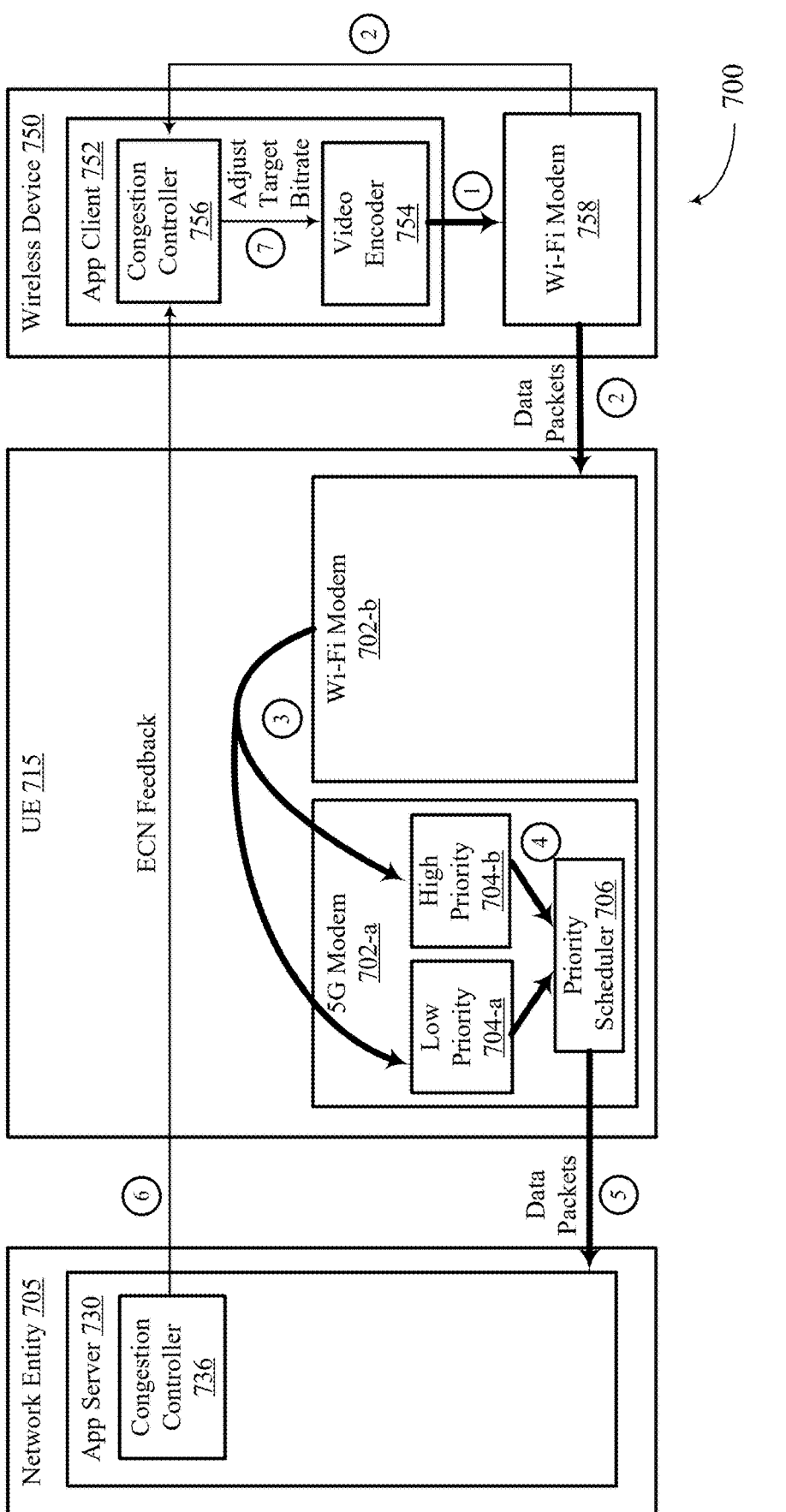
FIG. 7 shows an example of a system architecture illustrating uplink communications between devices of a wireless communications system that supports techniques for L4S capability at a UE in accordance with one or more aspects of the present disclosure.

FIG. 7 shows an example of a system architecture 700 illustrating uplink communications between devices of a wireless communications system that supports techniques for L4S capability at a UE in accordance with one or more aspects of the present disclosure. System architecture 700 may be implemented by aspects of the wireless communications systems 100 and 200 and system architectures 300 and 500, as described with reference to FIGS. 1, 2, 3, and 5, respectively. For example, the system architecture 700 may include a network entity 705, a UE 715, and a wireless device 750. The network entity 705 may be an example of the network entities 105, 205, 305, and 505 described with reference to FIGS. 1, 2, 3, 4, 5, and 6. The UE 715 may be an example of the UEs 115, 215, 315, and 515 described with reference to FIGS. 1, 2, 3, 4, 5, and 6. The wireless device 750 may be an example of the wireless devices 250, 350, and 550 described with reference to FIGS. 2, 3, 4, 5, and 6.

Some XR-applications may be uplink-heavy (e.g., sending video streams upstream to be processed at a server) and rate-adaptation may be helpful for the uplink flow of data. Accordingly, an uplink rate-adaptation procedure may be provided, as described with reference to FIGS. 7 to 10.

In some implementations, the network entity 705 may be configured with a server, such as an application server 730.

In some cases, the network entity 705 and the application server 730 may be separate entities that are communicatively coupled with one another. The application server 730 may support or interact with an application client implemented at the UE 715, the wireless device 750, or both. The application server 730 may be configured with a congestion controller 736. The congestion controller 736 may receive or obtain information indicating congestion associated with one or more communication links or packet buffers associated with the UE 715. In some cases, the congestion controller 736 may report feedback associated with the received congestion information to the application client 752 at the wireless device 750 so that a target bit rate for encoding video packets may be adjusted.

In some implementations, the UE 715 may be configured with multiple modems. For instance, the UE 715 may be configured with a cellular modem, such as a 5G modem 702-*a*, and a WLAN modem, such as a Wi-Fi modem 702-*b*. The 5G modem 702-*a* may be used to communicate data between the UE 715 and the network entity 705 via a communications link, such as a cellular communications link (e.g., 5G link). The Wi-Fi modem 702-*b* may be used to communicate data between the UE 715 and the wireless device 750 via a communications link, such as a WLAN communications link (e.g., a Wi-Fi link). The 5G modem 702-*a* may be configured with multiple L4S compliant packet queues, such as a low priority packet queue 704-*a* and a high priority packet queue 704-*b*. The 5G modem 702-*a* may also be configured with a priority scheduler 706. The priority scheduler 706 may be used to schedule the transmission of data packets from the packet queues 704-*a* and 704-*b* to the network entity 705. The scheduling may be based on a QoS priority associated with the queues.

In some implementations, the wireless device 750 may be configured with a WLAN modem, such as a Wi-Fi modem 758, and with an application client 752. The Wi-Fi modem 758 may be used to communicate data between the wireless device 750 and the UE 715 via a communications link, such as a WLAN communications link (e.g., a Wi-Fi link). The application client 752 may be configured to interact with the application server 730 to support an application at the wireless device 750. The application server 730 may be configured with a video encoder 754 and a congestion controller 756. The video encoder 754 may encode video packets to be transmitted to the UE 715, the network entity 705, or both. The congestion controller 756 may receive or obtain information indicating congestion associated with one or more communication links or data buffers associated with the UE 715. In some cases, the congestion controller 756 may control the video encoder 754 to adjust a target bit rate for encoding video packets based on the received congestion information. In some implementations, the wireless device 750 may be a XR device, such as an XR headset, XR glasses, or other XR device.

In the case of uplink communications at the system architecture 700, the UE 715 may receive, from the wireless device 750 and at the Wi-Fi modem 702-*b*, one or more data packets, such as one or more video packets encoded by the video encoder 754, one or more other non-video packets (e.g., classic packets), or both. The UE 315 may classify the one or more data packets as L4S packets or classic packets and may route the data packets from the Wi-Fi modem 702-*b* to appropriate packet queues, such as the low priority packet queue 704-*a* and the high priority packet queue 704-*b*, at the 5G modem 702-*a*. Based on buffer and link state information obtained from the 5G modem 702-*a*, the UE 715 may perform a congestion indication procedure. The congestion indication procedure may cause one or more of the packets in the packet queues to be marked with a congestion indication when congestion is detected based on the buffer and link state information from the 5G modem 702-*a*. The marked and unmarked packets may be routed from the low priority packet queue 704-*a* and the high priority packet queue 704-*b* to the application server 730 at the network entity 705, using the priority scheduler 706 and based on a corresponding QoS priority associated with the data packets, the packet queues 704-*a* and 704-*b*, or both. Further, the congestion controller 736 at the application server 730 may read the data packets to identify those marked as indicating that congestion was experienced. Based on detecting indications of congestion, the congestion controller 736 may transmit, to the congestion controller 756 at the wireless device 750 and via the UE 715, feedback indicating the congestion. In some cases, the congestion controller 756 may additionally receive buffer and link state information from the Wi-Fi modem 758 at the wireless device 750. In some cases, the congestion controller 756 may control the video encoder 754 to adjust a target encoding bitrate at the video encoder 754 based at least in part on the feedback from the network entity 705 indicating congestion at the 5G modem or 5G link and on the buffer and link state information from the Wi-Fi modem 758 at the wireless device 750.

Figure 8:
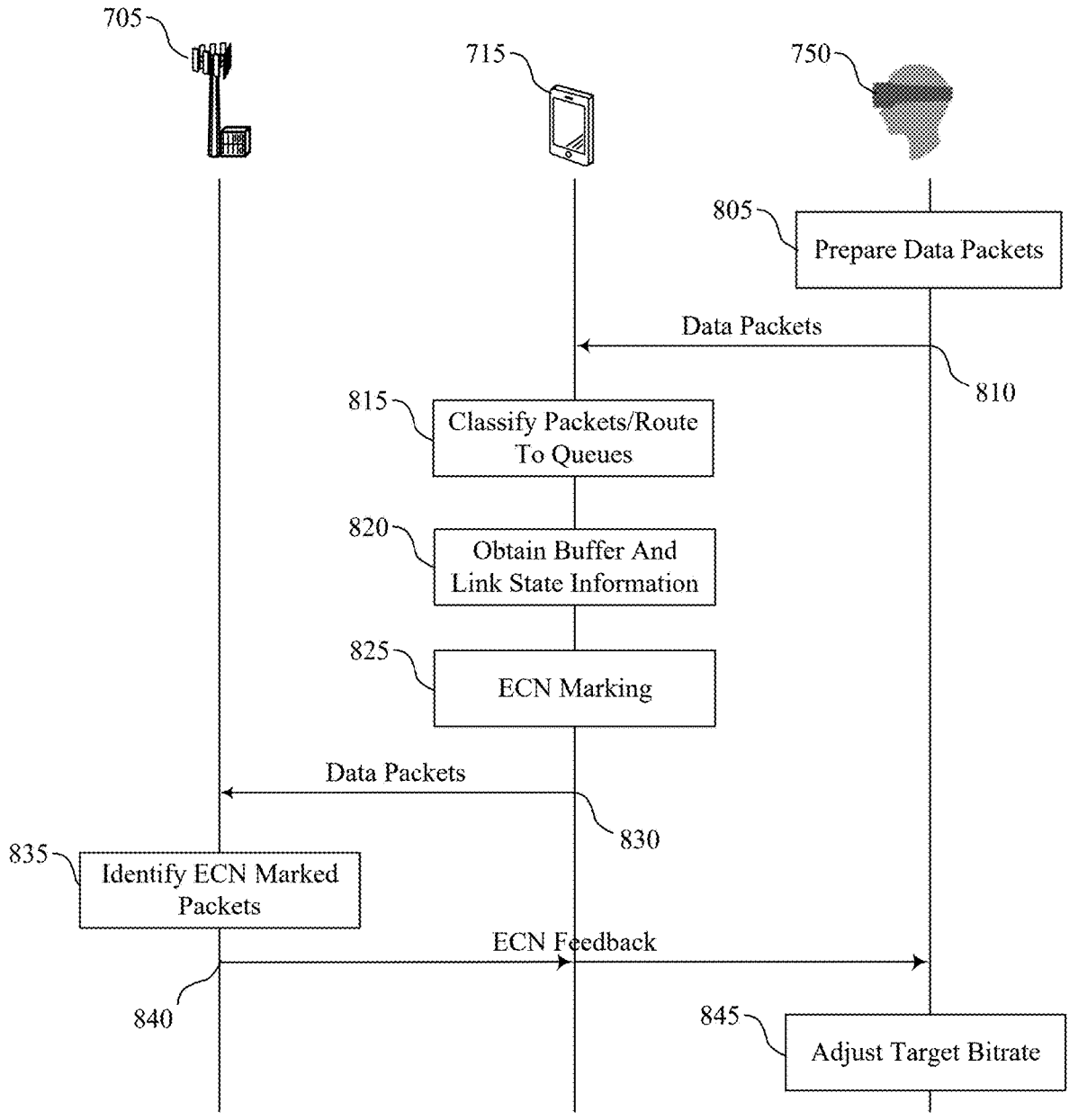
FIG. 8 shows an example of a signal flow illustrating uplink communications between devices of a wireless communications system that supports techniques for L4S capability at a UE in accordance with one or more aspects of the present disclosure.

FIG. 8 shows an example of a signal flow 800 illustrating uplink communications between devices of a wireless communications system that supports techniques for L4S capability at a UE in accordance with one or more aspects of the present disclosure. In some aspects, the signal flow 800 may implement or be implemented by aspects of the wireless communications systems 100 and 200 and system architectures 300 and 500 as described with reference to FIGS. 1, 2, 3, and 5, respectively. The signal flow 800 may illustrate the flow of signals between the network entity 705, the UE 715, and the wireless device 750 described with reference to FIG. 7. In the following description of the signal flow 800, the communications between the network entity 705, the UE 715, and the wireless device 750 may be transmitted in a different order than the order shown, or the operations performed by the network entity 705, the UE 715, and the wireless device 750 may be performed in different orders or at different times. Some operations may also be omitted from the signal flow 800, and other operations may be added to the signal flow 800. In some aspects, the operations illustrated in signal flow 800 may be performed by hardware (e.g., including circuitry, processing blocks, logic components, and other components), code (e.g., software or firmware) executed by a processor, or any combination thereof.

At 805, the wireless device 750 may prepare data packets for transmission to the UE 715. For instance, one or more video frames may be encoded by the video encoder 754 implemented at an application layer, such as at the application client 752, to generate video packets (e.g., video IP packets) for upstream transmission, via the UE 715 to the network entity 705. Encoding bitrate decisions may be based on OTT measurements, ECN feedback received from the network entity 705 and associated with a 5G link or the 5G modem 702-*a* at the UE 715, modem measurements received from the Wi-Fi modem 758 at the wireless device 750 (such as via a cross-layer API between the Wi-Fi modem 758 and the application client 752), or a combination of thereof. In addition to the video IP packets, one or more other non-video packets, e.g., classic packets, may be prepared for transmission to the UE 715. In some cases, before transmission of the data packets to the UE 715, the wireless device 750 may set an ECN field in an IP header of one or more of the data packets to indicate whether the data packet is associated with an ECN capable traffic flow, L4S capable traffic flow, or other type of traffic flow. For instance, the IP header of each data packet may include an ECN field (e.g., a two-bit field) that may be marked or set to indicate whether the data packet is a 'Not ECN-capable transport,' an 'ECN-capable transport—ECT(0) codepoint,' or an 'L4S-capable transport—ECT(1) codepoint.' Further, if the wireless device 750 experiences local congestion, the wireless device 750 may set the ECN field to indicate 'Congestion experienced—CE.'

At 810, the wireless device 750 may transmit, and the UE 715 may receive, the data packets. For instance, after setting the ECN field in a packet header of one or more of the data packets, the wireless device 750 may send the data packets to a WLAN modem of the wireless device 750, such as the Wi-Fi modem 758, and may transmit the data packets from the Wi-Fi modem 758 to the UE 715. The data packets may be received at a WLAN modem of the UE 315, such as the Wi-Fi modem 702-*b*. In some cases, the UE 715 may additionally receive data packets from one or more other network entities or servers.

At 815, the UE 715 may classify the received data packets and route the data packets to one or more L4S compliant packet queues. For instance, to operate as an L4S-capable node, the UE 715 may implement an AQM mechanism and may classify and segregate L4S data packets from other (e.g., classic) data packets. In some cases, the UE 715 may implement or be configured with a tethering service at an operating system of the wireless device 750. The tethering service may receive the data packets from the Wi-Fi modem 702-*b* and may classify the data packets as L4S data packets or classic data packets. The tethering service may inspect the ECN field in the packet header to determine whether the packet is an L4S data packet or a classic data packet. For instance, if the ECN field is set to ECT(1) codepoint, the data packet may be determined to be an L4S data packet (e.g., a high priority flow), and other data packets may be determined to be classic data packets (e.g., lower priority flows). In some cases, out of an abundance of caution, data packets marked as CE may also be classified as L4S data packets, since the wireless device 750 may not otherwise be able to determine whether the data packet was associated with an L4S flow or not. If the L4S flow is already mapped to a dedicated bearer, then the tethering service may not indicate any priority.

The tethering service may thereafter segregate data packets classified as L4S data packets (e.g., the ECT(1) codepoint and CE marked data packets) from data packets classified as classic data packets. The UE 715 may implement DualQ Coupled AQM to segregate and manage the L4S and classic data flows. Accordingly, the tethering service may route the L4S and classic data packets to separate corresponding packet queues associated with or implemented at the 5G modem 702-*a*. For instance, the classic packets may be routed to a first queue that handles classic data traffic, such as to a low priority packet queue 704-*a* associated with or implemented at the 5G modem 702-*a*. While the L4S packets may be routed to a second queue that handles L4S data traffic, such as to a high priority packet queue 704-*b* associated with or implemented at the 5G modem 702-*a*. In this way, the 5G modem 702-*a* may be able to treat the different traffic differently, such as by ensuring that high-priority traffic, such as the L4S data traffic, receives preferential treatment over lower priority traffic, such as the classic data traffic.

At 820, the UE 715 may obtain buffer and link state information. For instance, UE 715 may implement or be configured with a link and buffering monitoring function (LMBF), which may obtain buffer state information associated with the packet queues 704-*a* and 704-*b* at the 5G modem 702-*a* (e.g., buffer states), link state information associated with a 5G link between the 5G modem 702-*a* of the UE 715 and the network entity 705 (e.g., 5G LCE, or both. In some cases, the UE 315 may implement a cross-layer API that may be utilized to by the LBMF to obtain the buffer and link stat information from the 5G modem 702-*a*.

At 825, the UE 715 may perform a congestion indication procedure. For instance, the UE 715 may perform ECN marking of one or more of the data packets. The LBMF may utilize the obtained buffer and link state information to determine whether congestion is detected at the 5G modem 702-*a* or the 5G link, and may utilize a marking algorithm to perform ECN marking of one or more of the data packets based at least in part on the buffer and link state information. For instance, the LBMF may utilize a marking algorithm to mark one or more data packets in the packet queues 704-*a* and 704-*b* when congestion is detected at the 5G modem 702-*a* or the 5G link. Example marking algorithms that may be utilized by the LBMF include the L4S buffer state-based marking algorithm, the RTT-based marking algorithm, the delay-based marking algorithm, the contention-based marking algorithm, or any other marking algorithm.

At 830, the UE 715 may transmit, and the network entity 705 may receive, the data packets. For instance, the UE 715 may utilize the priority scheduler 706 implemented or configured at the 5G modem 702-*a* to schedule transmission of the data packets from the packet queues 704-*a* and 704-*b*, based on respective priorities associated with the packet queues 704-*a* and 704-*b*. For instance, the priority scheduler 706 may prioritize transmission of the data packets in the high priority packet queue 704-*b* over data packets in the low priority packet queue 704-*a*.

At 835, the network entity 705 may identify the ECN marked packets. For instance, the network entity 705 may implement a congestion controller 736 at the application server 730. The congestion controller 736 may inspect the packet headers of each of the data packets and read the ECN field to determine whether congestion was experienced by the data packet. If the ECN field indicates CE, the congestion controller 736 may determine that congestion was experienced by the data packet. The congestion controller 736 may count a quantity of packets that have been marked with CE to determine an amount or percentage of data packets that experienced congestion at the 5G modem 702-*a* or the 5G link.

At 840, the network entity 705 may transmit ECN feedback to the wireless device 750. For instance, the congestion controller 736 at the application server 730 at the network entity 705 may transmit ECN feedback to the congestion controller 756 implemented at the application client 752 at the wireless device 750. In some cases, the ECN feedback may be transmitted to the wireless device 750, via the UE 715. The ECN feedback may be based on the determined amount or percentage of data packets that experienced congestion at the 5G modem 702-*a* or the 5G link. The ECN feedback may be transmitted in a feedback report via real-time control protocol (RTCP) feedback. The feedback may be immediate after each data packet is received or may be pooled into a single feedback after multiple data packets are received.

At 845, the wireless device 750 may adjust a target bitrate for encoding data packets. For instance, the congestion controller 756 may utilize an L4S-compliant congestion control algorithm to calculate a target bitrate based on the feedback from the network entity 705. In some cases, the L4S-compliant congestion control algorithm may additionally calculate the target bitrate based on link and buffer state information associated with the Wi-Fi modem 758 at the wireless device 750. For instance, the congestion controller 756 may implement a cross-layer API to obtain link and buffer state information from the Wi-Fi modem 758. The congestion controller 756 may control the video encoder to adjust a video encoding bitrate based on the calculated target bitrate.

Figure 9:
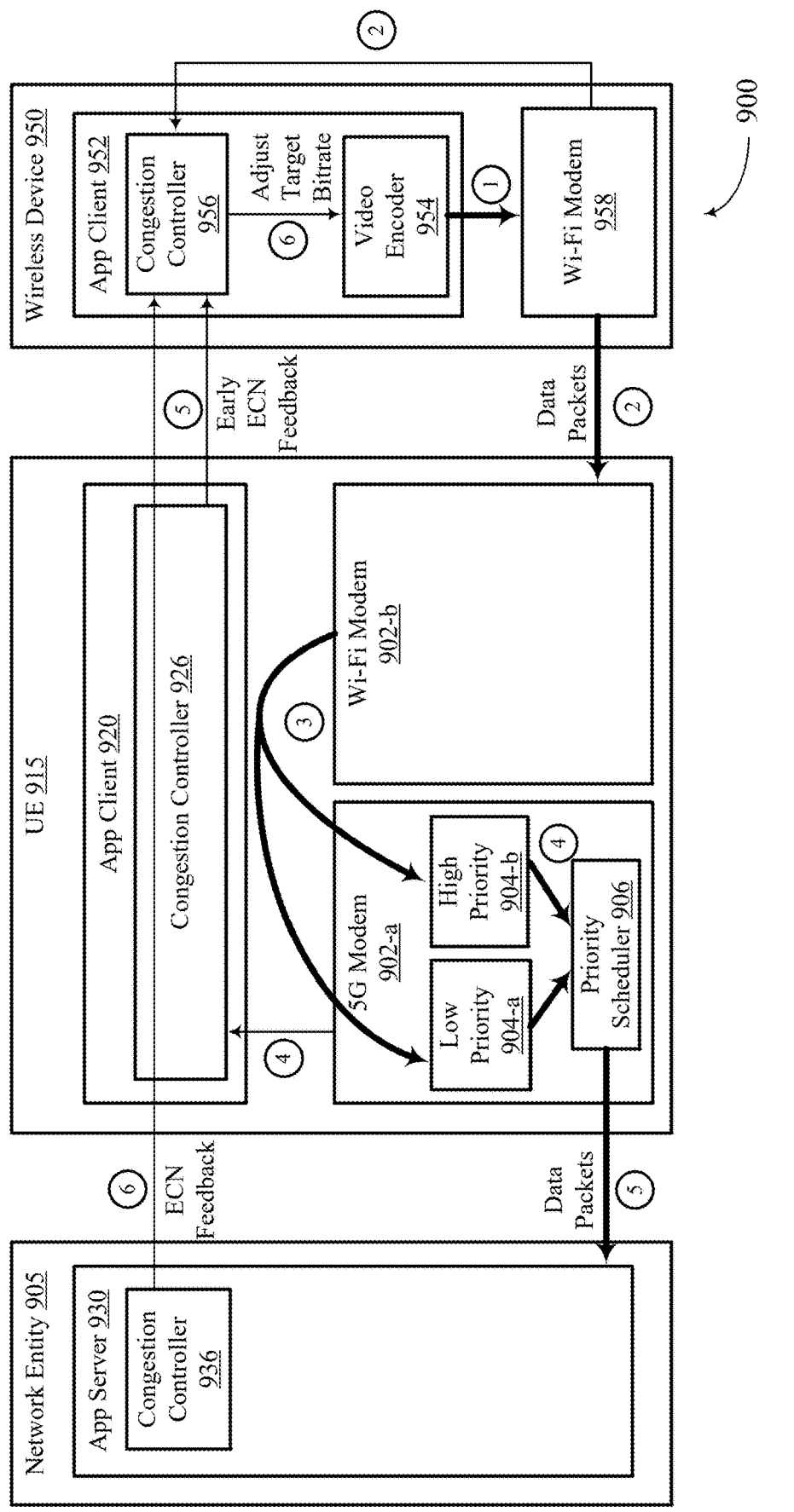
FIG. 9 shows an example of a system architecture illustrating uplink communications between devices of a wireless communications system that supports techniques for L4S capability at a UE in accordance with one or more aspects of the present disclosure.

FIG. 9 shows an example of a system architecture 900 illustrating uplink communications between devices of a wireless communications system that supports techniques for L4S capability at a UE in accordance with one or more aspects of the present disclosure. System architecture 900 may be implemented by aspects of the wireless communications systems 100 and 200 and system architectures 300, 500, and 700, as described with reference to FIGS. 1, 2, 3, 5, and 7, respectively. For example, the system architecture 900 may include a network entity 905, a UE 915, and a wireless device 950. The network entity 905 may be an example of the network entities 105, 205, 305, 505, and 705 described with reference to FIGS. 1, 2, 3, 4, 5, 6, and 7. The UE 915 may be an example of the UEs 115, 215, 315, 515, and 715 described with reference to FIGS. 1, 2, 3, 4, 5, 6, and 7. The wireless device 950 may be an example of the wireless devices 250, 350, 550, and 750 described with reference to FIGS. 2, 3, 4, 5, 6, and 7.

The system architecture 900 may be similar to system architecture 700, except that in addition to implementing a congestion controller 936 at application server 930 at the network entity 905, an application client 920 and corresponding congestion controller 926 may also be implemented at the UE 915. In such cases, the LBMF may not mark the data packets received from the wireless device 950 with the congestion indication and, instead, may directly send ECN feedback (e.g., early ECN feedback) to the wireless device 950 based on the buffer and link state information associated with the 5G modem 902-*a*. In this way, the congestion indication does not need to make a trip from the UE 915 to the network entity 905 and then to the wireless device 950. Instead, an early indication of congestion on the 5G link or at the 5G modem 902-*a* may be provided directly to the wireless device 950, while bypassing the network entity 905, so that the wireless device 950 may make adjustments to the encoding bitrate sooner.

Accordingly, in the case of uplink communications at the system architecture 900, the UE 915 may receive, from the wireless device 950 and at a Wi-Fi modem 902-*b*, one or more data packets, such as one or more video packets encoded by the video encoder 954 at the wireless device 950, one or more other non-video packets (e.g., classic packets), or both. The UE 915 may classify the one or more data packets as L4S packets or classic packets and may route the data packets from the Wi-Fi modem 902-*b* to appropriate packet queues, such as the low priority packet queue 904-*a* and the high priority packet queue 904-*b*, at the 5G modem 902-*a*. Based on buffer and link state information obtained from the 5G modem 902-*a*, the UE 915 may perform a congestion indication procedure. The congestion indication procedure may involve the transmission of early congestion-related feedback from the UE 915 to the congestion controller 956 at the wireless device 950. The early congestion-related feedback may be based on the buffer and link state information from the 5G modem 902-*a*. In some cases, the congestion controller 956 may additionally receive congestion-related feedback from the network entity 905 based on buffer and link state information associated with a link between the network entity 905 and a device, such as a server, upstream from the network entity 905 or an associated buffer. In some cases, the congestion controller 956 may additionally receive buffer and link state information from the Wi-Fi modem 958 at the wireless device 950 (such as associated with a Wi-Fi link between the wireless device 950 and the UE 915 or an associated buffer). The congestion controller 956 may control the video encoder 954 to adjust a target encoding bitrate at the video encoder 954 based at least in part on the early feedback from the UE 915 indicating congestion at the 5G modem or 5G link, the feedback from the network entity 905 indicating upstream congestion, the buffer and link state information from the Wi-Fi modem 958 indicating congestion at a Wi-Fi modem or Wi-Fi link, or a combination thereof. Further, before, after, or concurrent with transmission of the early congestion feedback from the UE 915 to the wireless device 950, the UE 915 may route the data packets from the low priority packet queue 904-*a* and the high priority packet queue 904-*b* to the network entity 905, using the priority scheduler 906 and based on a corresponding QoS priority associated with the data packets, the packet queues 904-*a* and 904-*b*, or both.

Figure 10:
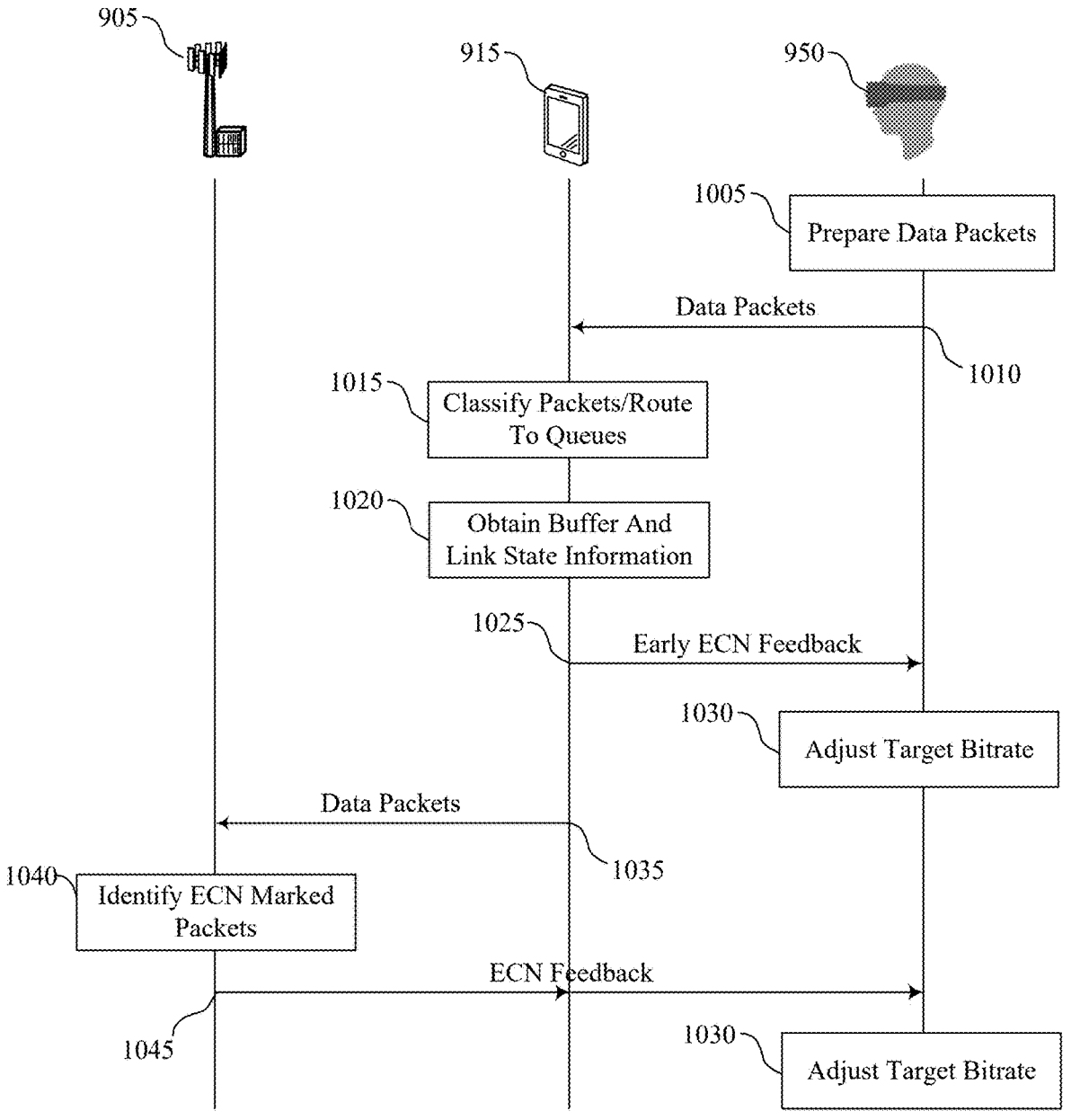
FIG. 10 shows an example of a signal flow illustrating uplink communications between devices of a wireless com-

FIG. 10 shows an example of a signal flow 1000 illustrating uplink communications between devices of a wireless communications system that supports techniques for L4S capability at a UE in accordance with one or more aspects of the present disclosure. In some aspects, the signal flow 1000 may implement or be implemented by aspects of the wireless communications systems 100 and 200 and system architectures 300, 500, and 700 as described with reference to FIGS. 1, 2, 3, 5, and 7, respectively. The signal flow 1000 may illustrate the flow of signals between the network entity 905, the UE 915, and the wireless device 950 described with reference to FIG. 7. In the following description of the signal flow 1000, the communications between the network entity 905, the UE 915, and the wireless device 950 may be transmitted in a different order than the order shown, or the operations performed by the network entity 905, the UE 915, and the wireless device 950 may be performed in different orders or at different times. Some operations may also be omitted from the signal flow 1000, and other operations may be added to the signal flow 1000. In some aspects, the operations illustrated in signal flow 1000 may be performed by hardware (e.g., including circuitry, processing blocks, logic components, and other components), code (e.g., software or firmware) executed by a processor, or any combination thereof.

At 1005, the wireless device 950 may prepare data packets for transmission to the UE 915. For instance, the wireless device 950 may prepare the data packets for transmission in a manner similar to that described with reference to 805 of FIG. 8.

At 1010, the wireless device 950 may transmit, and the UE 915 may receive, the data packets. For instance, the wireless device 950 may transmit the data packets to the UE 915 in a manner similar to that described with reference to 810 of FIG. 8.

At 1015, the UE 915 may classify the received data packets and route the data packets to one or more L4S compliant packet queues. For instance, the UE 915 may classify and route the data packets in a manner similar to that described with reference to 815 of FIG. 8.

At 1020, the UE 915 may obtain buffer and link state information. For instance, the UE 915 may obtain the buffer and link state information in a manner similar to that described with reference to 820 of FIG. 8.

At 1025, the UE 915 may perform a congestion indication procedure. For instance, the UE 915 may transmit early ECN feedback to the wireless device 950. The congestion controller 926 at the application layer (e.g., at the application client 920) of the UE 915 may transmit the early ECN feedback to the congestion controller 956 at the application layer (e.g., the application client 952) of the wireless device 950. The early ECN feedback may be based on a determined amount or percentage of data packets that experienced congestion at the 5G modem 902-*a* or the 5G link, such as based on the obtained buffer and link state information from the 5G modem 902-*a*. The early ECN feedback may be transmitted in a feedback report via real-time control protocol (RTCP) feedback. The feedback may be immediate after each data packet is received or may be pooled into a single feedback after multiple data packets are received.

At 1030, the wireless device 950 may adjust a target bitrate for encoding data packets. For instance, the wireless device 950 may adjust the target bitrate for encoding data packets based at least in part on the received early ECN feedback from the UE 915. For instance, the wireless device 950 may adjust the target bitrate in a manner similar to that described with reference to 845 of FIG. 8.

At 1035, before, after, or concurrent with transmitting the early ECN feedback to the wireless device 950, the UE 915 may transmit, and the network entity 905 may receive, the data packets. For instance, the UE 915 may transmit the data packets to the network entity 905 in a manner similar to that described with reference to 830 of FIG. 8.

At 1040, the network entity 905 may identify ECN marked packets. For instance, the network entity 905 may identify the ECN marked packets in a manner similar to that described with respect to 835 of FIG. 8. In this case, however, because the UE 915 did not mark the incoming data packets, the identified ECN markings may be based on markings performed upstream of the network entity 905 (such as based on congestion associated with a link or buffer upstream from the network entity 905).

At 1045, the network entity 905 may transmit ECN feedback to the wireless device 950. For instance, the congestion controller 936 at the application server 930 at the network entity 905 may transmit the ECN feedback to the congestion controller 956 at the application layer, such as the application client 952 at the wireless device 950. In this case, the ECN feedback may be based on congestion experienced upstream from the network entity 905. In some cases, the ECN feedback may be transmitted to the congestion controller 956 at the wireless device 950 via the congestion controller 926 at the application client 920 at the UE 915.

At 1050, the wireless device 950 may adjust a target bitrate for encoding data packets. For instance, the wireless device 950 may adjust the target bitrate for encoding data packets in a manner similar to that described with reference to 845 of FIG. 8.

FIG. 11 shows a block diagram 1100 of a device 1105 that supports techniques for L4S capability at a UE in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for L4S capability at a UE). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for L4S capability at a UE). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations or components thereof may be examples of means for performing various aspects of techniques for L4S capability at a UE as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for receiving, at a first modem of the UE and from a first device, one or more data packets. The communications manager 1120 is capable of, configured to, or operable to support a means for routing the one or more data packets from the first modem to two or more queues associated with a second modem of the UE based on an ECT codepoint indication in respective header portions of the one or more data packets. The communications manager 1120 is capable of, configured to, or operable to support a means for receiving buffer and link state information associated with the second modem. The communications manager 1120 is capable of, configured to, or operable to support a means for performing, based on the buffer and link state information, a congestion indication procedure, where the congestion indication procedure is associated with congestion of a communication link for the UE. The communications manager 1120 is capable of, configured to, or operable to support a means for transmitting, to a second device and based on a respective priority associated with the two or more queues, packet data from the two or more queues associated with the second modem of the UE.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced latency, reduced power consumption and more efficient utilization of communication resources.

FIG. 12 shows a block diagram 1200 of a device 1205 that supports techniques for L4S capability at a UE in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for L4S capability at a UE). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for L4S capability at a UE). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for L4S capability at a UE as described herein. For example, the communications manager 1220 may include a data packet manager 1225, a tethering service manager 1230, an LBMF manager 1235, a ECN manager 1240, a priority scheduler manager 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The data packet manager 1225 is capable of, configured to, or operable to support a means for receiving, at a first modem of the UE and from a first device, one or more data packets. The tethering service manager 1230 is capable of, configured to, or operable to support a means for routing the one or more data packets from the first modem to two or more queues associated with a second modem of the UE based on an ECT codepoint indication in respective header portions of the one or more data packets. The LBMF manager 1235 is capable of, configured to, or operable to support a means for receiving buffer and link state information associated with the second modem. The ECN manager 1240 is capable of, configured to, or operable to support a means for performing, based on the buffer and link state information, a congestion indication procedure, where the congestion indication procedure is associated with congestion of a communication link for the UE. The priority scheduler manager 1245 is capable of, configured to, or operable to support a means for transmitting, to a second device and based on a respective priority associated with the two or more queues, packet data from the two or more queues associated with the second modem of the UE.

FIG. 13 shows a block diagram 1300 of a communications manager 1320 that supports techniques for L4S capability at a UE in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for L4S capability at a UE as described herein. For example, the communications manager 1320 may include a data packet manager 1325, a tethering service manager 1330, an LBMF manager 1335, a ECN manager 1340, a priority scheduler manager 1345, or any combination thereof. Each of these components, or components or subcomponents thereof (e.g., one or more processors, one or more memories), may communicate, directly or indirectly, with one another (e.g., via one or more buses).

The communications manager 1320 may support wireless communications in accordance with examples as disclosed herein. The data packet manager 1325 is capable of, configured to, or operable to support a means for receiving, at a first modem of the UE and from a first device, one or more data packets. The tethering service manager 1330 is capable of, configured to, or operable to support a means for routing the one or more data packets from the first modem to two or more queues associated with a second modem of the UE based on an ECT codepoint indication in respective header portions of the one or more data packets. The LBMF manager 1335 is capable of, configured to, or operable to support a means for receiving buffer and link state information associated with the second modem. The ECN manager 1340 is capable of, configured to, or operable to support a means for performing, based on the buffer and link state information, a congestion indication procedure, where the congestion indication procedure is associated with congestion of a communication link for the UE. The priority scheduler manager 1345 is capable of, configured to, or operable to support a means for transmitting, to a second device and based on a respective priority associated with the two or more queues, packet data from the two or more queues associated with the second modem of the UE.

In some examples, to support routing the one or more data packets to the two or more queues associated with the second modem of the UE, the tethering service manager 1330 is capable of, configured to, or operable to support a means for classifying as L4S IP packets the one or more data packets having the ECT codepoint indication including a first value, where the L4S IP packets are associated with a first QoS priority level. In some examples, to support routing the one or more data packets to the two or more queues associated with the second modem of the UE, the tethering service manager 1330 is capable of, configured to, or operable to support a means for classifying as classic IP packets the one or more data packets having the ECT codepoint indication including a second value different from the first value, where the classic IP packets are associated with a second QoS priority level that is lower than the first QoS priority level. In some examples, to support routing the one or more data packets to the two or more queues associated with the second modem of the UE, the tethering service manager 1330 is capable of, configured to, or operable to support a means for routing the L4S IP packets to a first queue associated with the second modem and routing the classic IP packets to a second queue associated with the second modem.

In some examples, to support receiving the one or more data packets, the data packet manager 1325 is capable of, configured to, or operable to support a means for receiving, at a 5G modem of the UE and from a network entity, one or more L4S IP packets, one or more classic IP data packets, or a combination thereof.

In some examples, to support routing the one or more data packets from the first modem to the two or more queues associated with the second modem of the UE, the tethering service manager 1330 is capable of, configured to, or operable to support a means for routing the one or more data packets from a 5G modem of the UE to two or more queues associated with a Wi-Fi modem of the UE.

In some examples, to support receiving the buffer and link state information associated with the second modem, the LBMF manager 1335 is capable of, configured to, or operable to support a means for receiving, from a Wi-Fi modem of the UE, buffer state information associated with buffers associated with the Wi-Fi modem of the UE and link state information associated with a Wi-Fi link between the Wi-Fi modem of the UE and a Wi-Fi modem of a wireless device.

In some examples, to support transmitting the packet data from the two or more queues associated with the second modem of the UE to the second device, the priority scheduler manager 1345 is capable of, configured to, or operable to support a means for transmitting, via a Wi-Fi link, the packet data from two or more queues associated with a Wi-Fi modem of the UE to a wireless device.

In some examples, to support receiving the one or more data packets, the data packet manager 1325 is capable of, configured to, or operable to support a means for receiving, at a Wi-Fi modem of the UE and from a wireless device, one or more L4S IP packets, one or more classic IP packets, or a combination thereof.

In some examples, to support routing the one or more data packets from the first modem to the two or more queues associated with the second modem of the UE, the tethering service manager 1330 is capable of, configured to, or operable to support a means for routing the one or more data packets from a Wi-Fi modem of the UE to two or more queues associated with a 5G modem of the UE.

In some examples, to support receiving the buffer and link state information associated with the second modem, the LBMF manager 1335 is capable of, configured to, or operable to support a means for receiving, from a 5G modem of the UE, buffer state information associated with buffers associated with the 5G modem of the UE and link state information associated with a 5G link between the 5G modem of the UE and a network entity.

In some examples, to support transmitting the packet data from the two or more queues associated with the second modem of the UE to the second device, the priority scheduler manager 1345 is capable of, configured to, or operable to support a means for transmitting, via a 50 link, the packet data from the two or more queues associated with a 5G modem of the UE to a network entity.

In some examples, to support performing the congestion indication procedure, the ECN manager 1340 is capable of, configured to, or operable to support a means for performing, based on the ECT codepoint indication in the respective header portions of the one or more data packets and on the buffer and link state information associated with the second modem, ECN marking of at least one data packet of the one or more data packets.

In some examples, to support performing the ECN marking of the at least one data packet, the ECN manager 1340 is capable of, configured to, or operable to support a means for adjusting, from a first value to a second value and based on the buffer and link state information associated with the second modem, the ECT codepoint indication in a respective header portion of the at least one data packet, where the second value indicates that congestion is detected.

In some examples, the at least one data packet includes an L4S IP packet.

In some examples, the buffer and link state information includes information associated with buffers associated with a Wi-Fi modem of the UE and information associated with a Wi-Fi link between the Wi-Fi modem of the UE and a Wi-Fi modem of the second device. In some examples, the second device includes a wireless device.

In some examples, the buffer and link state information includes information associated with buffers associated with a 5G modem at the UE and information associated with a 5G link between the 5G modem of the UE and the second device. In some examples, the second device includes a network entity.

In some examples, to support performing the ECN marking of the one or more data packets, the ECN manager 1340 is capable of, configured to, or operable to support a means for performing the ECN marking of the one or more data packets based on an ECN marking algorithm, where the ECN marking algorithm includes a buffer state-based marking algorithm, a RTT-based marking algorithm, a delay-based marking algorithm, or a contention delay-based marking algorithm.

In some examples, to support performing the congestion indication procedure, the ECN manager 1340 is capable of, configured to, or operable to support a means for transmitting, to the first device and based on the buffer and link state information associated with the second modem, ECN feedback.

In some examples, the ECN feedback is transmitted without performing ECN marking of the one or more data packets.

In some examples, the buffer and link state information includes information associated with buffers associated with a Wi-Fi modem of the UE and information associated with a Wi-Fi link between the Wi-Fi modem of the UE and a Wi-Fi modem of the second device. In some examples, the second device includes a wireless device.

In some examples, the buffer and link state information includes information associated with buffers associated with a 5G modem associated with the UE and information associated with a 5G link between the 5G modem of the UE and the second device. In some examples, the second device includes a network entity.

In some examples, the first device includes a network entity and the second device includes a wireless device.

In some examples, the first device includes a wireless device and the second device includes a network entity.

FIG. 14 shows a diagram of a system 1400 including a device 1405 that supports techniques for L4S capability at a UE in accordance with one or more aspects of the present disclosure. The device 1405 may be an example of or include components of a device 1105, a device 1205, or a UE 115 as described herein. The device 1405 may communicate (e.g., wirelessly) with one or more other devices (e.g., network entities 105, UEs 115, or a combination thereof). The device 1405 may include components for bi-directional voice and data communications including components for transmitting and receiving communications, such as a communications manager 1420, an input/output (I/O) controller, such as an I/O controller 1410, a transceiver 1415, one or more antennas 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of one or more processors, such as the at least one processor 1440. In some cases, a user may interact with the device 1405 via the I/O controller 1410 or via hardware components controlled by the I/O controller 1410.

In some cases, the device 1405 may include a single antenna. However, in some other cases, the device 1405 may have more than one antenna, which may be capable of concurrently transmitting or receiving multiple wireless transmissions. The transceiver 1415 may communicate bi-directionally via the one or more antennas 1425 using wired or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The at least one memory 1430 may include random access memory (RAM) and read-only memory (ROM). The at least one memory 1430 may store computer-readable, computer-executable, or processor-executable code, such as the code 1435. The code 1435 may include instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the at least one memory 1430 may include, among other things, a basic I/O system (BIOS) which may control basic hardware or software operation such as the interaction with peripheral components or devices.

The at least one processor 1440 may include one or more intelligent hardware devices (e.g., one or more general-purpose processors, one or more DSPs, one or more CPUs, one or more GPUs, one or more NPUs (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the at least one memory 1430) to cause the device 1405 to perform various functions (e.g., functions or tasks supporting techniques for L4S capability at a UE). For example, the device 1405 or a component of the device 1405 may include at least one processor 1440 and at least one memory 1430 coupled with or to the at least one processor 1440, the at least one processor 1440 and the at least one memory 1430 configured to perform various functions described herein.

In some examples, the at least one processor 1440 may include multiple processors and the at least one memory 1430 may include multiple memories. One or more of the multiple processors may be coupled with one or more of the multiple memories, which may, individually or collectively, be configured to perform various functions described herein. In some examples, the at least one processor 1440 may be a component of a processing system, which may refer to a system (such as a series) of machines, circuitry (including, for example, one or both of processor circuitry (which may include the at least one processor 1440) and memory circuitry (which may include the at least one memory 1430), or components, that receives or obtains inputs and processes the inputs to produce, generate, or obtain a set of outputs. The processing system may be configured to perform one or more of the functions described herein. For example, the at least one processor 1440 or a processing system including the at least one processor 1440 may be configured to, configurable to, or operable to cause the device 1405 to perform one or more of the functions described herein. Further, as described herein, being "configured to," being "configurable to," and being "operable to" may be used interchangeably and may be associated with a capability, when executing code 1435 (e.g., processor-executable code) stored in the at least one memory 1430 or otherwise, to perform one or more of the functions described herein.

The communications manager 1420 may support wireless communications in accordance with examples as disclosed herein. For example, the communications manager 1420 is capable of, configured to, or operable to support a means for receiving, at a first modem of the UE and from a first device, one or more data packets. The communications manager 1420 is capable of, configured to, or operable to support a means for routing the one or more data packets from the first modem to two or more queues associated with a second modem of the UE based on an ECT codepoint indication in respective header portions of the one or more data packets. The communications manager 1420 is capable of, configured to, or operable to support a means for receiving buffer and link state information associated with the second modem. The communications manager 1420 is capable of, configured to, or operable to support a means for performing, based on the buffer and link state information, a congestion indication procedure, where the congestion indication procedure is associated with congestion of a communication link for the UE. The communications manager 1420 is capable of, configured to, or operable to support a means for transmitting, to a second device and based on a respective priority associated with the two or more queues, packet data from the two or more queues associated with the second modem of the UE.

By including or configuring the communications manager 1420 in accordance with examples as described herein, the device 1405 may support techniques, for improved communication reliability, reduced latency, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the at least one memory 1430, the code 1435, or any combination thereof. For example, the code 1435 may include instructions executable by the at least one processor 1440 to cause the device 1405 to perform various aspects of techniques for L4S capability at a UE as described herein, or the at least one processor 1440 and the at least one memory 1430 may be otherwise configured to, individually or collectively, perform or support such operations.

FIG. 15 shows a flowchart illustrating a method 1500 that supports techniques for L4S capability at a UE in accordance with one or more aspects of the present disclosure.

The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1505, the method may include receiving, at a first modem of the UE and from a first device, one or more data packets. The operations of 1505 may be performed in accordance with examples as disclosed herein. In some examples, aspects of the operations of 1505 may be performed by a data packet manager 1325 as described with reference to FIG. 13.

At 1510, the method may include routing the one or more data packets from the first modem to two or more queues associated with a second modem of the UE based on an ECT codepoint indication in respective header portions of the one or more data packets. The operations of 1510 may be performed in accordance with examples as disclosed herein. In some examples, aspects of the operations of 1510 may be performed by a tethering service manager 1330 as described with reference to FIG. 13.

At 1515, the method may include receiving buffer and link state information associated with the second modem. The operations of 1515 may be performed in accordance with examples as disclosed herein. In some examples, aspects of the operations of 1515 may be performed by an LBMF manager 1335 as described with reference to FIG. 13.

At 1520, the method may include performing, based on the buffer and link state information, a congestion indication procedure, where the congestion indication procedure is associated with congestion of a communication link for the UE. The operations of 1520 may be performed in accordance with examples as disclosed herein. In some examples, aspects of the operations of 1520 may be performed by a ECN manager 1340 as described with reference to FIG. 13.

At 1525, the method may include transmitting, to a second device and based on a respective priority associated with the two or more queues, packet data from the two or more queues associated with the second modem of the UE. The operations of 1525 may be performed in accordance with examples as disclosed herein. In some examples, aspects of the operations of 1525 may be performed by a priority scheduler manager 1345 as described with reference to FIG. 13.

FIG. 16 shows a flowchart illustrating a method 1600 that supports techniques for L4S capability at a UE in accordance with one or more aspects of the present disclosure. The operations of the method 1600 may be implemented by a UE or its components as described herein. For example, the operations of the method 1600 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1605, the method may include receiving, at a first modem of the UE and from a first device, one or more data packets. The operations of 1605 may be performed in accordance with examples as disclosed herein. In some examples, aspects of the operations of 1605 may be performed by a data packet manager 1325 as described with reference to FIG. 13.

At 1610, the method may include routing the one or more data packets from the first modem to two or more queues associated with a second modem of the UE based on an ECT codepoint indication in respective header portions of the one or more data packets. The operations of 1610 may be performed in accordance with examples as disclosed herein. In some examples, aspects of the operations of 1610 may be performed by a tethering service manager 1330 as described with reference to FIG. 13.

At 1615, the method may include receiving buffer and link state information associated with the second modem. The operations of 1615 may be performed in accordance with examples as disclosed herein. In some examples, aspects of the operations of 1615 may be performed by an LBMF manager 1335 as described with reference to FIG. 13.

At 1620, the method may include performing, based on the ECT codepoint indication in the respective header portions of the one or more data packets and on the buffer and link state information associated with the second modem, ECN marking of at least one data packet of the one or more data packets. The operations of 1620 may be performed in accordance with examples as disclosed herein. In some examples, aspects of the operations of 1620 may be performed by a ECN manager 1340 as described with reference to FIG. 13.

At 1625, the method may include transmitting, to a second device and based on a respective priority associated with the two or more queues, packet data from the two or more queues associated with the second modem of the UE. The operations of 1625 may be performed in accordance with examples as disclosed herein. In some examples, aspects of the operations of 1625 may be performed by a priority scheduler manager 1345 as described with reference to FIG. 13.

FIG. 17 shows a flowchart illustrating a method 1700 that supports techniques for L4S capability at a UE in accordance with one or more aspects of the present disclosure. The operations of the method 1700 may be implemented by a UE or its components as described herein. For example, the operations of the method 1700 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1705, the method may include receiving, at a first modem of the UE and from a first device, one or more data packets. The operations of 1705 may be performed in accordance with examples as disclosed herein. In some examples, aspects of the operations of 1705 may be performed by a data packet manager 1325 as described with reference to FIG. 13.

At 1710, the method may include routing the one or more data packets from the first modem to two or more queues associated with a second modem of the UE based on an ECT codepoint indication in respective header portions of the one or more data packets. The operations of 1710 may be performed in accordance with examples as disclosed herein. In some examples, aspects of the operations of 1710 may be performed by a tethering service manager 1330 as described with reference to FIG. 13.

At 1715, the method may include receiving buffer and link state information associated with the second modem. The operations of 1715 may be performed in accordance with examples as disclosed herein. In some examples, aspects of the operations of 1715 may be performed by an LBMF manager 1335 as described with reference to FIG. 13.

At 1720, the method may include transmitting, to the first device and based on the buffer and link state information associated with the second modem, ECN feedback. The operations of 1720 may be performed in accordance with examples as disclosed herein. In some examples, aspects of the operations of 1720 may be performed by a ECN manager 1340 as described with reference to FIG. 13.

At 1725, the method may include transmitting, to a second device and based on a respective priority associated with the two or more queues, packet data from the two or more queues associated with the second modem of the UE. The operations of 1725 may be performed in accordance with examples as disclosed herein. In some examples, aspects of the operations of 1725 may be performed by a priority scheduler manager 1345 as described with reference to FIG. 13.

The following provides an overview of aspects of the present disclosure:

Aspect 1: A method for wireless communications by a UE, comprising: receiving, at a first modem of the UE and from a first device, one or more data packets; routing the one or more data packets from the first modem to two or more queues associated with a second modem of the UE based at least in part on an explicit congestion notification (ECN)-capable transport (ECT) codepoint indication in respective header portions of the one or more data packets; receiving buffer and link state information associated with the second modem; performing, based at least in part on the buffer and link state information, a congestion indication procedure, wherein the congestion indication procedure is associated with congestion of a communication link associated with the UE; and transmitting, to a second device and based at least in part on a respective priority associated with the two or more queues, packet data from the two or more queues associated with the second modem of the UE.

Aspect 2: The method of aspect 1, wherein routing the one or more data packets to the two or more queues associated with the second modem of the UE comprises: classifying as Low Latency Low Loss Scalable Throughput (L4S) internet protocol (IP) packets the one or more data packets having the ECT codepoint indication comprising a first value, wherein the L4S IP packets are associated with a first quality of service (QoS) priority level; classifying as classic IP packets the one or more data packets having the ECT codepoint indication comprising a second value different from the first value, wherein the classic IP packets are associated with a second QoS priority level that is lower than the first QoS priority level; and routing the L4S IP packets to a first queue associated with the second modem and routing the classic IP packets to a second queue associated with the second modem.

Aspect 3: The method of any of aspects 1 through 2, wherein receiving the one or more data packets comprises: receiving, at a 5G modem of the UE and from a network entity, one or more Low Latency Low Loss Scalable Throughput (L4S) internet protocol (IP) packets, one or more classic IP data packets, or a combination thereof.

Aspect 4: The method of any of aspects 1 through 3, wherein routing the one or more data packets from the first modem to the two or more queues associated with the second modem of the UE comprises: routing the one or more data packets from a 5G modem of the UE to two or more queues associated with a Wi-Fi modem of the UE.

Aspect 5: The method of any of aspects 1 through 4, wherein receiving the buffer and link state information associated with the second modem comprises: receiving, from a Wi-Fi modem of the UE, buffer state information associated with buffers associated with the Wi-Fi modem of the UE and link state information associated with a Wi-Fi link between the Wi-Fi modem of the UE and a Wi-Fi modem of a wireless device.

Aspect 6: The method of any of aspects 1 through 5, wherein transmitting the packet data from the two or more queues associated with the second modem of the UE to the second device comprises: transmitting, via a Wi-Fi link, the packet data from two or more queues associated with a Wi-Fi modem of the UE to a wireless device.

Aspect 7: The method of any of aspects 1 through 6, wherein receiving the one or more data packets comprises: receiving, at a Wi-Fi modem of the UE and from a wireless device, one or more Low Latency Low Loss Scalable Throughput (L4S) internet protocol (IP) packets, one or more classic IP packets, or a combination thereof.

Aspect 8: The method of any of aspects 1 through 7, wherein routing the one or more data packets from the first modem to the two or more queues associated with the second modem of the UE comprises: routing the one or more data packets from a Wi-Fi modem of the UE to two or more queues associated with a 5G modem of the UE.

Aspect 9: The method of any of aspects 1 through 8, wherein receiving the buffer and link state information associated with the second modem comprises: receiving, from a 5G modem of the UE, buffer state information associated with buffers associated with the 5G modem of the UE and link state information associated with a 5G link between the 5G modem of the UE and a network entity.

Aspect 10: The method of any of aspects 1 through 9, wherein transmitting the packet data from the two or more queues associated with the second modem of the UE to the second device comprises: transmitting, via a 5G link, the packet data from the two or more queues associated with a 5G modem of the UE to a network entity.

Aspect 11: The method of any of aspects 1 through 10, wherein performing the congestion indication procedure comprises: performing, based at least in part on the ECT codepoint indication in the respective header portions of the one or more data packets and on the buffer and link state information associated with the second modem, ECN marking of at least one data packet of the one or more data packets.

Aspect 12: The method of aspect 11, wherein performing the ECN marking of the at least one data packet comprises: adjusting, from a first value to a second value and based at least in part on the buffer and link state information associated with the second modem, the ECT codepoint indication in a respective header portion of the at least one data packet, wherein the second value indicates that congestion is detected.

Aspect 13: The method of aspect 12, wherein the at least one data packet comprises a Low Latency Low Loss Scalable Throughput (L4S) internet protocol (P) packet.

Aspect 14: The method of any of aspects 11 through 13, wherein the buffer and link state information comprises information associated with buffers associated with a Wi-Fi modem of the UE and information associated with a Wi-Fi link between the Wi-Fi modem of the UE and a Wi-Fi modem of the second device, the second device comprises a wireless device.

Aspect 15: The method of any of aspects 11 through 14, wherein the buffer and link state information comprises information associated with buffers associated with a 5G modem at the UE and information associated with a 5G link between the 5G modem of the UE and the second device, the second device comprises a network entity.

Aspect 16: The method of any of aspects 11 through 15, wherein performing the ECN marking of the one or more data packets comprises: performing the ECN marking of the one or more data packets based at least in part on an ECN marking algorithm, wherein the ECN marking algorithm comprises a buffer state-based marking algorithm, a round-trip time (RTT)-based marking algorithm, a delay-based marking algorithm, or a contention delay-based marking algorithm.

Aspect 17: The method of any of aspects 1 through 16, wherein performing the congestion indication procedure comprises: transmitting, to the first device and based at least in part on the buffer and link state information associated with the second modem, ECN feedback.

Aspect 18: The method of aspect 17, wherein the ECN feedback is transmitted without performing ECN marking of the one or more data packets.

Aspect 19: The method of any of aspects 17 through 18, wherein the buffer and link state information comprises information associated with buffers associated with a Wi-Fi modem of the UE and information associated with a Wi-Fi link between the Wi-Fi modem of the UE and a Wi-Fi modem of the second device, the second device comprises a wireless device.

Aspect 20: The method of any of aspects 17 through 19, wherein the buffer and link state information comprises information associated with buffers associated with a 5G modem associated with the UE and information associated with a 5G link between the 5G modem of the UE and the second device, the second device comprises a network entity.

Aspect 21: The method of any of aspects 1 through 20, wherein the first device comprises a network entity and the second device comprises a wireless device.

Aspect 22: The method of any of aspects 1 through 21, wherein the first device comprises a wireless device and the second device comprises a network entity.

Aspect 23: A UE for wireless communications, comprising one or more memories storing processor-executable code, and one or more processors coupled with the one or more memories and individually or collectively operable to execute the code to cause the UE to perform a method of any of aspects 1 through 22.

Aspect 24: A UE for wireless communications, comprising at least one means for performing a method of any of aspects 1 through 22.

Aspect 25: A non-transitory computer-readable medium storing code for wireless communications, the code comprising instructions executable by one or more processors to perform a method of any of aspects 1 through 22.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
    one or more memories storing processor-executable code; and
    one or more processors coupled with the one or more memories and individually or collectively operable to execute the code to cause the UE to:
        receive, at a first modem of the UE and from a first device, one or more data packets;
        route the one or more data packets from the first modem to two or more queues associated with a second modem of the UE based at least in part on an explicit congestion notification (ECN)-capable transport (ECT) codepoint indication in respective header portions of the one or more data packets;
        receive buffer and link state information associated with the second modem;
        perform, based at least in part on the buffer and link state information, a congestion indication procedure, wherein the congestion indication procedure is associated with congestion of a communication link for the UE; and
        transmit, to a second device and based at least in part on a respective priority associated with the two or more queues, packet data from the two or more queues associated with the second modem of the UE.

2. The UE of claim 1, wherein, to route the one or more data packets to the two or more queues associated with the second modem of the UE, the one or more processors are individually or collectively operable to execute the code to cause the UE to:
    classify as Low Latency Low Loss Scalable Throughput (L4S) internet protocol (IP) packets the one or more data packets having the ECT codepoint indication comprising a first value, wherein the L4S IP packets are associated with a first quality of service (QoS) priority level;
    classify as classic IP packets the one or more data packets having the ECT codepoint indication comprising a second value different from the first value, wherein the classic IP packets are associated with a second QoS priority level that is lower than the first QoS priority level; and
    route the L4S IP packets to a first queue associated with the second modem and routing the classic IP packets to a second queue associated with the second modem.

3. The UE of claim 1, wherein, to receive the one or more data packets, the one or more processors are individually or collectively operable to execute the code to cause the UE to:
    receive, at a 5G modem of the UE and from a network entity, one or more Low Latency Low Loss Scalable Throughput (L4S) Internet protocol (IP) packets, one or more classic IP packets, or a combination thereof, and
    wherein, to route the one or more data packets, the one or more processors are individually or collectively operable to execute the code to cause the UE to:
        route the one or more L4S IP packets, the one or more classic IP packets, or a combination thereof from the 5G modem to two or more queues associated with a Wi-Fi modem of the UE.

4. The UE of claim 1, wherein, to receive the buffer and link state information associated with the second modem, the one or more processors are individually or collectively operable to execute the code to cause the UE to:
    receive, from a Wi-Fi modem of the UE, buffer state information associated with buffers associated with the Wi-Fi modem of the UE and link state information associated with a Wi-Fi link between the Wi-Fi modem of the UE and a Wi-Fi modem of a wireless device, and
    wherein, to transmit the packet data, the one or more processors are individually or collectively operable to execute the code to cause the UE to:
        transmit, from two or more queues associated with the Wi-Fi modem, to the wireless device, and via the Wi-Fi link, the packet data.

5. The UE of claim 1, wherein, to receive the one or more data packets, the one or more processors are individually or collectively operable to execute the code to cause the UE to:
    receive, at a Wi-Fi modem of the UE and from a wireless device, one or more Low Latency Low Loss Scalable Throughput (L4S) internet protocol (IP) packets, one or more classic IP packets, or a combination thereof, and
    wherein, to route the one or more data packets, the one or more processors are individually or collectively operable to execute the code to cause the UE to:
        route the one or more L4S IP packets, the one or more classic IP packets, or a combination thereof from the Wi-Fi modem to two or more queues associated with a 5G modem of the UE.

6. The UE of claim 1, wherein, to receive the buffer and link state information associated with the second modem, the one or more processors are individually or collectively operable to execute the code to cause the UE to:
    receive, from a 5G modem of the UE, buffer state information associated with buffers associated with the 5G modem of the UE and link state information associated with a 5G link between the 5G modem of the UE and a network entity, and
    wherein, to transmit the packet data, the one or more processors are individually or collectively operable to execute the code to cause the UE to:

transmit, from the two or more queues associated with the 5G modem, to the network entity, and via the 5G link, the packet data.

7. The UE of claim 1, wherein, to perform the congestion indication procedure, the one or more processors are individually or collectively operable to execute the code to cause the UE to:

perform, based at least in part on the ECT codepoint indication in the respective header portions of the one or more data packets and on the buffer and link state information associated with the second modem, ECN marking of at least one data packet of the one or more data packets.

8. The UE of claim 7, wherein, to perform the ECN marking of the at least one data packet, the one or more processors are individually or collectively operable to execute the code to cause the UE to:

adjust, from a first value to a second value and based at least in part on the buffer and link state information associated with the second modem, the ECT codepoint indication in a respective header portion of the at least one data packet, wherein the second value indicates that congestion is detected.

9. The UE of claim 8, wherein the at least one data packet comprises a Low Latency Low Loss Scalable Throughput (L4S) Internet protocol (IP) packet.

10. The UE of claim 7, wherein:

the buffer and link state information comprises information associated with buffers associated with a Wi-Fi modem of the UE and information associated with a Wi-Fi link between the Wi-Fi modem of the UE and a Wi-Fi modem of the second device, and the second device comprises a wireless device.

11. The UE of claim 7, wherein:

the buffer and link state information comprises information associated with buffers associated with a 5G modem at the UE and information associated with a 5G link between the 5G modem of the UE and the second device, and the second device comprises a network entity.

12. The UE of claim 7, wherein, to perform the ECN marking of the one or more data packets, the one or more processors are individually or collectively operable to execute the code to cause the UE to:

perform the ECN marking of the one or more data packets based at least in part on an ECN marking algorithm, wherein the ECN marking algorithm comprises a buffer state-based marking algorithm, a RTT-based marking algorithm, a delay-based marking algorithm, or a contention delay-based marking algorithm.

13. The UE of claim 1, wherein, to perform the congestion indication procedure, the one or more processors are individually or collectively operable to execute the code to cause the UE to:

transmit, to the first device and based at least in part on the buffer and link state information associated with the second modem, ECN feedback.

14. The UE of claim 13, wherein the ECN feedback is transmitted without performing ECN marking of the one or more data packets.

15. The UE of claim 13, wherein:

when the second device comprises a wireless device, the buffer and link state information comprises information associated with buffers associated with a Wi-Fi modem of the UE and information associated with a Wi-Fi link between the Wi-Fi modem of the UE and a Wi-Fi modem of the wireless device, and when the second device comprises a network entity, the buffer and link state information comprises information associated with buffers associated with a 5G modem associated with the UE and information associated with a 5G link between the 5G modem of the UE and the network entity.

16. A method for wireless communications by a user equipment (UE), comprising:

receiving, at a first modem of the UE and from a first device, one or more data packets;

routing the one or more data packets from the first modem to two or more queues associated with a second modem of the UE based at least in part on an explicit congestion notification (ECN)-capable transport (ECT) codepoint indication in respective header portions of the one or more data packets;

receiving buffer and link state information associated with the second modem;

performing, based at least in part on the buffer and link state information, a congestion indication procedure, wherein the congestion indication procedure is associated with congestion of a communication link for the UE; and transmitting, to a second device and based at least in part on a respective priority associated with the two or more queues, packet data from the two or more queues associated with the second modem of the UE.

17. The method of claim 16, wherein routing the one or more data packets to the two or more queues associated with the second modem of the UE comprises:

classifying as Low Latency Low Loss Scalable Throughput (L4S) Internet protocol (IP) packets the one or more data packets having the ECT codepoint indication comprising a first value, wherein the L4S IP packets are associated with a first quality of service (QoS) priority level;

classifying as classic IP packets the one or more data packets having the ECT codepoint indication comprising a second value different from the first value, wherein the classic IP packets are associated with a second QoS priority level that is lower than the first QoS priority level; and routing the L4S IP packets to a first queue associated with the second modem and routing the classic IP packets to a second queue associated with the second modem.

18. The method of claim 16, wherein performing the congestion indication procedure comprises:

performing, based at least in part on the ECT codepoint indication in the respective header portions of the one or more data packets and on the buffer and link state information associated with the second modem, ECN marking of at least one data packet of the one or more data packets, wherein performing the ECN marking of the at least one data packet comprises:

adjusting, from a first value to a second value and based at least in part on the buffer and link state information associated with the second modem, the ECT codepoint indication in a respective header portion of the at least one data packet, wherein the second value indicates that congestion is detected.

19. The method of claim 16, wherein performing the congestion indication procedure comprises:

transmitting, to the first device and based at least in part on the buffer and link state information associated with the second modem, ECN feedback.

20. A non-transitory computer-readable medium storing code for wireless communications, the code comprising instructions executable by one or more processors of a user equipment (UE) to:

receive, at a first modem of the UE and from a first device, one or more data packets;

route the one or more data packets from the first modem to two or more queues associated with a second modem of the UE based at least in part on an explicit congestion notification (ECN)-capable transport (ECT) code-point indication in respective header portions of the one or more data packets;

receive buffer and link state information associated with the second modem;

perform, based at least in part on the buffer and link state information, a congestion indication procedure, wherein the congestion indication procedure is associated with congestion of a communication link for the UE; and transmit, to a second device and based at least in part on a respective priority associated with the two or more queues, packet data from the two or more queues associated with the second modem of the UE.

\* \* \* \* \*